(12) United States Patent
Watanabe et al.

(10) Patent No.: US 7,545,887 B2
(45) Date of Patent: Jun. 9, 2009

(54) SYNCHRONOUS DETECTION METHOD AND DEVICE

(75) Inventors: Takamoto Watanabe, Nagoya (JP); Tetsuya Nakamura, Chiryu (JP); Sumio Masuda, Tokyo (JP)

(73) Assignee: DENSO CORPORATION, Kariya (JP)

( * ) Notice: Subject to any disclaimer, the term of this patent is extended or adjusted under 35 U.S.C. 154(b) by 794 days.

(21) Appl. No.: 10/926,286

(22) Filed: Aug. 26, 2004

(65) Prior Publication Data

US 2005/0047526 A1 Mar. 3, 2005

(30) Foreign Application Priority Data

Aug. 29, 2003 (JP) ............................. 2003-307328
Mar. 31, 2004 (JP) ............................. 2004-105391

(51) Int. Cl.
  *H04L 27/00* (2006.01)
(52) U.S. Cl. ....................................... 375/326
(58) Field of Classification Search ................. 375/326, 375/354, 357, 369, 372, 373, 374, 316; 370/395.62, 370/507; 455/265; 702/89; 713/375, 400
  See application file for complete search history.

(56) References Cited

U.S. PATENT DOCUMENTS

| 5,049,830 | A | * | 9/1991 | Yoshida ...................... 329/306 |
| 5,638,406 | A | * | 6/1997 | Sogabe ....................... 375/326 |
| 2003/0039325 | A1 | | 2/2003 | Watanabe et al. |
| 2005/0085249 | A1 | * | 4/2005 | Goldstein et al. ........... 455/502 |

FOREIGN PATENT DOCUMENTS

| JP | 5-199205 | 8/1993 |
| JP | 6-269060 | 9/1994 |
| JP | 2003-65768 | 3/2003 |

* cited by examiner

*Primary Examiner*—Sam K Ahn
(74) *Attorney, Agent, or Firm*—Posz Law Group, PLC

(57) ABSTRACT

In a synchronous detection method, an input signal is averaged over at least first and second phase ranges of a target carrier wave within each period thereof to obtain at least first and second moving average values of the input signal within the at least first and second phase ranges, respectively. The first phase range corresponds to a positively oscillating phase range of the target carrier wave, and the second phase range corresponds to a negatively oscillating phase range thereof. A difference between the first and second moving averages is calculated as a detection result of the target carrier wave.

24 Claims, 21 Drawing Sheets

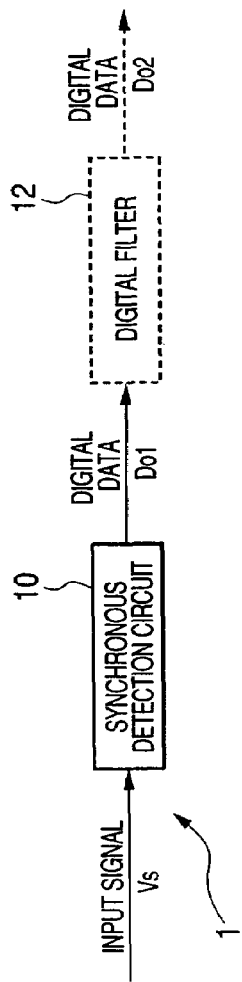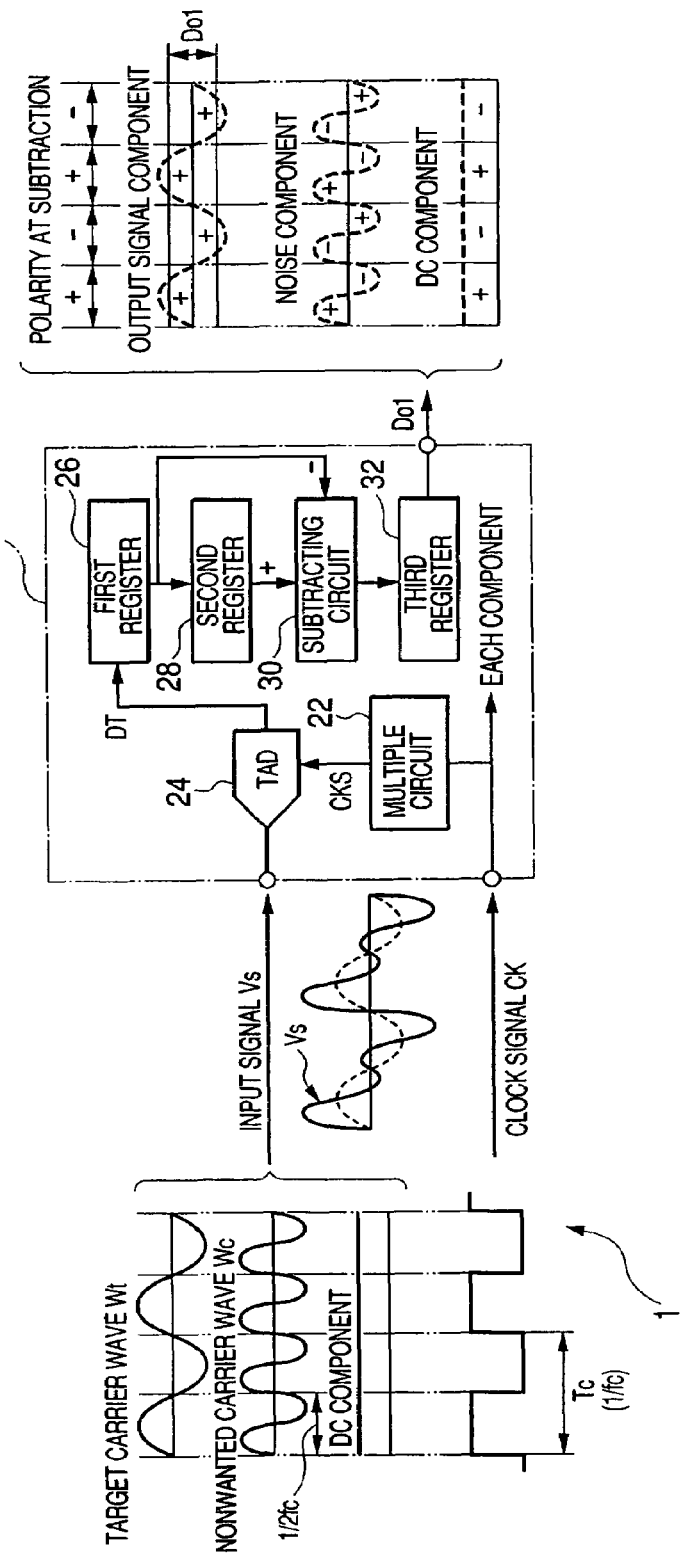

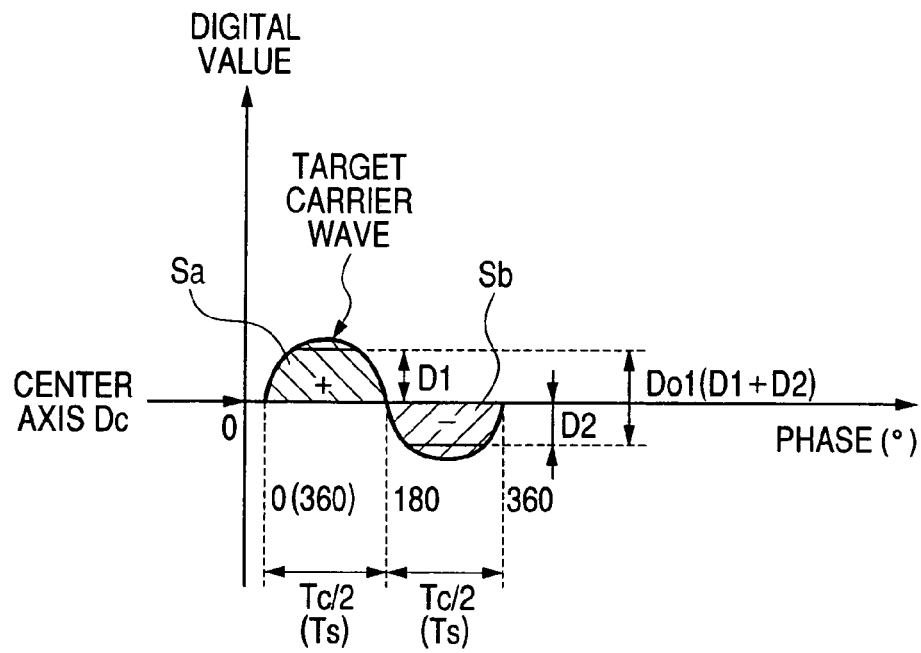
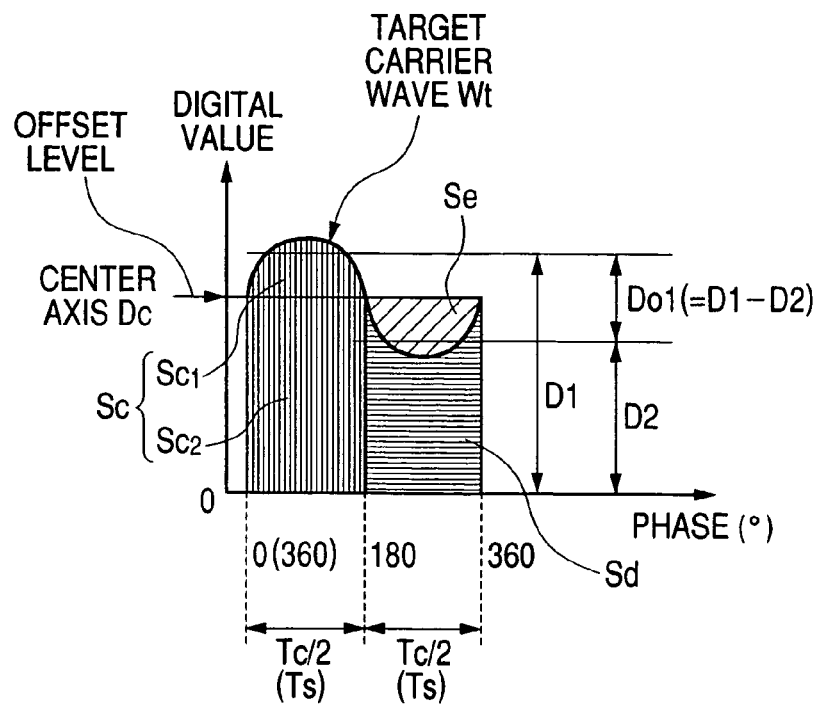

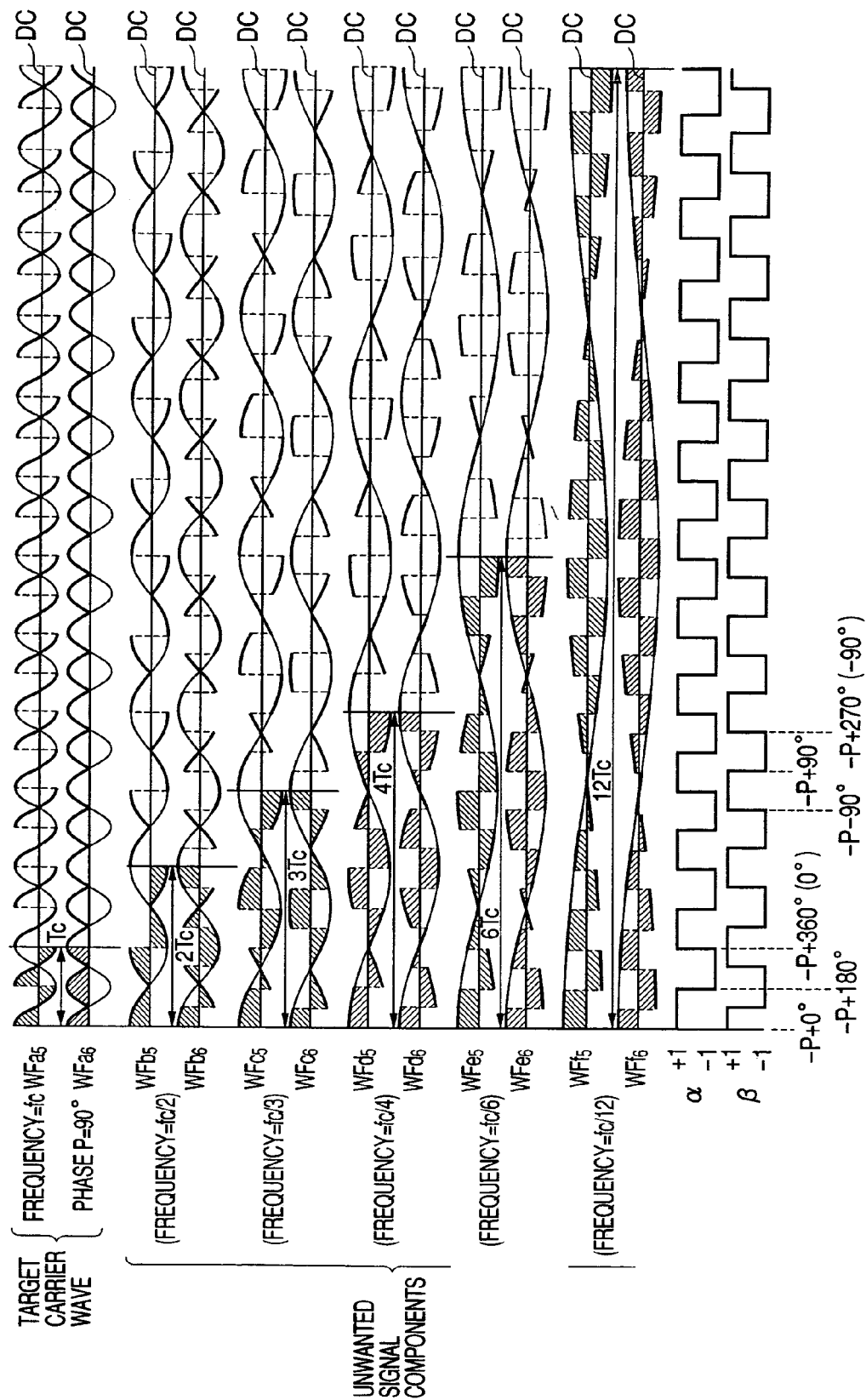

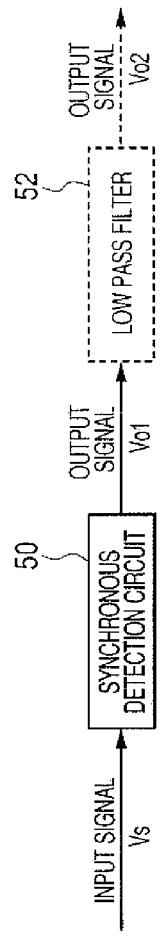
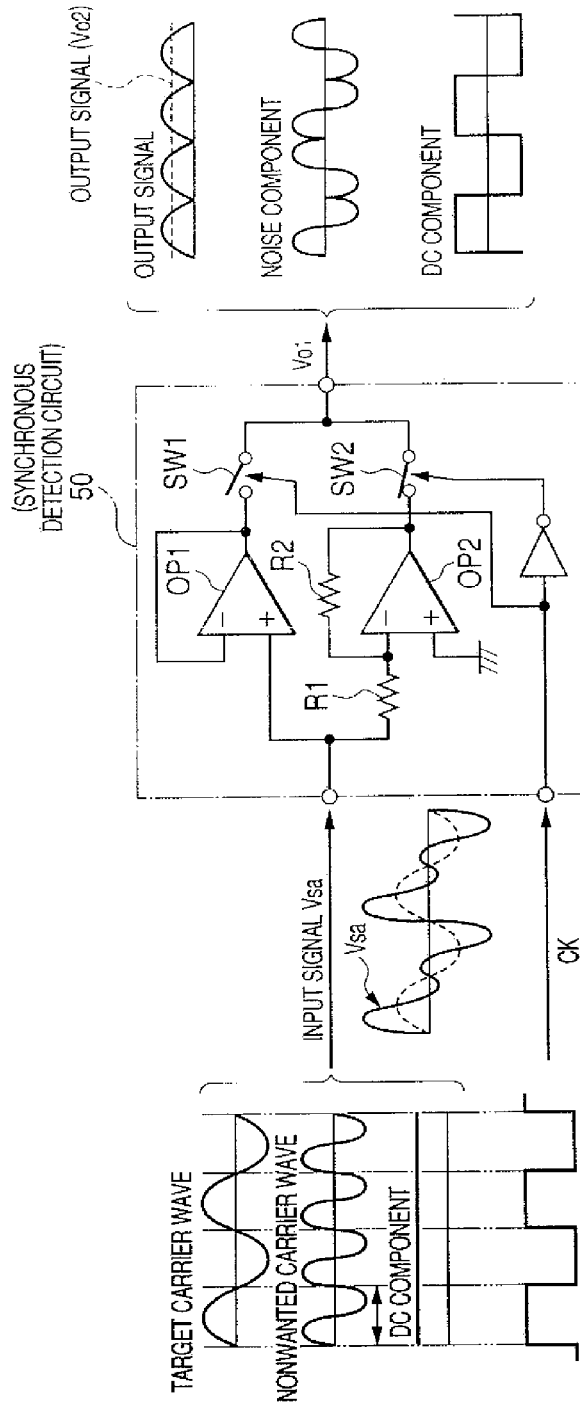

SYNCHRONOUS DETECTION METHOD AND DEVICE

CROSS REFERENCE TO RELATED APPLICATION

This application is based upon and claims the benefit of priority of the prior Japanese Patent Application 2003-307328 filed on Aug. 29, 2003, and the prior Japanese Patent Application 2004-105391 filed on Mar. 31, 2004 so that the descriptions of which are incorporated herein by reference.

BACKGROUND OF THE INVENTION

1. Field of the Invention

The present invention relates to a synchronous detection method and device, which are used for detecting signal components modulated on a target carrier wave contained in an input signal.

2. Description of the Related Art

When separating desired signal components from an input signal with a low signal to noise ratio (S/N ratio) or extracting a target carrier wave with a desired frequency from an input signal containing a plurality of carrier waves having different frequencies with each other, various types of synchronous detection devices have been used. One of which is disclosed in Japanese Unexamined Patent Publication H6-269060, and another one of which is disclosed in U.S. Patent Application Publication No. 2003/0039325A1 corresponding to Japanese Unexamined Patent Publication 2003-65768.

An example of conventional synchronous detection devices is illustrated in FIGS. 19A and 19B. The conventional synchronous detection device is used for reducing at least one carrier wave and a direct current (DC) component, which are components to be eliminated, from an input signal Vsa including a target carrier wave. In particular, the synchronous detection device has an analog synchronous detection circuit 50.

In the synchronous detection circuit 50, the input signal Vsa is separated into two input signals Vsa. One of the separated input signals Vsa is fed to a voltage follower composed of an operational amplifier OP1, which is served as a buffer circuit. The one of the separated input signals Vsa is converted by the voltage follower into a first output signal whose signal level is obtained by multiplying the signal level of the one of the separated input signals Vsa by the gain of "+1".

The other of the separated input signals Vsa is fed to an inverting amplifier composed of an operational amplifier OP2 and resistors R1 and R2 (see FIG. 19B). The inverting amplifier multiplies the signal level of the other of the separated input signals Vsa by the gain of "−(R2/R1)" to convert it into a second output signal.

Assuming that the resistances R1 and R2 are set to be equal to each other in FIG. 19B, the signal level of the second output signal is obtained by multiplying the signal level of the other of the separated input signals Vsa by the gain of "−1".

Switches SW1 and SW2 are connected to the output paths of the operational amplifiers OP1 and OP2, respectively. The switches SW1 and SW2 are alternatively turned on in synchronization with a clock signal CK with the same frequency (clock pulse frequency) as the target carrier wave.

The alternative turning on of the switches SW1 and SW2 allows the first and second output signals to be alternatively outputted as an output signal Vo1. That is, the input signal Vsa is alternatively inverted and non-inverted in the half periods (half pulse periods) of the clock signal CK to be outputted as the output signal Vo1.

As described above, when the input signal Vsa includes the at least one carrier wave except for the target carrier wave and the DC component, which are to be eliminated, in addition to the target carrier wave of detection, the conventional synchronous detection device uses the analog synchronous detection circuit 50. The analog synchronous detection circuit 50 eliminates the at least one carrier wave and the DC component. That is, the analog synchronous detection circuit 50 shown in FIG. 19B rectifies both positive and negative half-waves of the input signal Vsa in synchronization with the clock signal CK to convert the negative half wave of the input signal Vsa into a positive half wave, thereby canceling the at least one carrier wave and the DC component.

The output signal Vo1 outputted from the synchronous detection circuit 50 is obtained by rectifying both positive and negative half-waves of the input signal Vsa including the target carrier wave, This results in that high frequency noise components containing fluctuations of the target carrier wave itself and/or noises that are not eliminated by the synchronous detection circuit 50 remain in the output voltage Vo1.

For eliminating the high frequency noise components from the output signal Vo1, as shown in FIG. 19B, the conventional synchronous detection device is provide at the output side of the synchronous detection circuit 50 with an analog low pass filter 52. That is, the analog low pass filter 52 eliminates the high frequency noise components from the output signal Vo1, thereby outputting an output signal Vo2 while stabilizing it.

The conventional synchronous detection device uses the analog synchronous detection circuit 50 having analog amplifying circuits, such as the operational amplifiers OP1 and OP2, to rectify both positive and negative half-waves of the input signal Vsa. This may result in that noise components generated by the operations of the analog amplifying circuits (the operational amplifiers OP1 and OP2) are superimposed on the output signal Vo1 from the synchronous detection circuit 50. The noise components may not be sufficiently eliminated by the low pass filter 52 so that the noise components may remain in the output signal Vo2, which may contribute to the difficulty of the signal detection, in other words the synchronous detection, with high precision.

When implementing the synchronous detection device in a chip, 2 different analog amplifying circuits, such as the operational amplifiers OP1 and OP2, must be implemented in the chip, which may make it difficult to reduce the synchronous detection device in size and in cost. Especially, for maintaining the signal level of each noise component outputted from each analog amplifying circuit within a predetermined target level, a footprint of each analog amplifying circuit on the chip needs to increase. The increase of the footprint of each analog amplifying circuit may also contribute to the difficulty of the reduction of the synchronous detection device in size and in cost.

An analog amplifying circuit, such as an operational amplifier, has characteristics that widely fluctuate depending on the fluctuations of the circuit's part characteristics, such as the characteristics of transistors, the resistances of resistors, and the capacitances of capacitors. These circuit's part characteristics of the analog amplifying circuit are susceptible to environmental changes around the circuit, such as temperature changes. Using such analog amplifying circuits to the synchronous detection device may make it difficult to improve the environmental resistance of the synchronous detection device and to ensure the reliability thereof.

In addition, the analog low pass filter 52 is composed of an operational amplifier, resistors, capacitors, and other components, and especially, the resistors and the capacitors are external components. The characteristics of the operational amplifier, the resistors, and the capacitors of the analog low pass filter 52 are also susceptible to environmental changes around the circuit, which may cause the reliability of the synchronous detection device to deteriorate.

SUMMARY OF THE INVENTION

The present invention is made on the background to improve the environmental resistance and the reliability of a synchronous detection device.

According to one aspect of the present invention, there is provided a synchronous detection method of detecting a target carrier wave from an input signal containing the target carrier wave. The target carrier wave periodically oscillates positively and negatively in time according to a constant frequency and a period. The method comprises: averaging the input signal over at least first and second phase ranges of the target carrier wave within each period thereof to obtain at least first and second moving average values of the input signal within the at least first and second phase ranges, respectively, the first phase range corresponding to a phase range within which the target carrier wave positively oscillates, the second phase range corresponding to a phase range within which the target carrier wave negatively oscillates; and calculating a difference between the first and second moving averages as a detection result of the target carrier wave.

According to another aspect of the present invention, there is provided a synchronous detection method of detecting a target carrier wave with a constant frequency and a period from an input signal containing the target carrier wave. The method comprises averaging the input signal each half of each period of the target carrier wave to obtain a first moving average value, a second moving average value, a third moving average value, and a fourth moving average value. The first moving average value of the input signal is within a phase range between an arbitrary phase (p) in degrees of the target carrier wave and (p+180) degrees thereof. The second moving average value of the input signal is within a phase range between (p+180) degrees of the target carrier wave and (p+360) degrees thereof. The third moving average value of the input signal is within a phase range between (p+90) degrees of the target carrier wave and (p+270) degrees thereof. The fourth moving average value of the input signal is within a phase range between (p+270) degrees and (p+450) degrees. The method comprises calculating a first difference between the first moving average and the second moving average and a second difference between the third moving average and the fourth moving average as a detection result of the target carrier wave.

According to a further aspect of the present invention, there is provided a synchronous detection method of detecting a target carrier wave with a constant frequency and a period from an input signal containing the target carrier wave. The method comprises averaging the input signal each quarter of each period of the target carrier wave to obtain a first moving average value (S1), a second moving average value (S2), a third moving average value (S3), and a fourth moving average value (S4). The first moving average value S1 of the input signal is within a phase range between an arbitrary phase (p) in degrees of the target carrier wave and (p+90) degrees thereof. The second moving average value S2 of the input signal is within a phase range between (p+90) degrees of the target carrier wave and (p+180) degrees thereof. The third moving average value S3 of the input signal is within a phase range between (p+180) degrees of the target carrier wave and (p+270) degrees thereof. The fourth moving average value S4 of the input signal is within a phase range between (p+270) degrees and (p+360) degrees. The method comprises calculating I and Q representing a detection result of the target carrier wave in accordance with the following equations:

$$I = S1 + S2 - S3 - S4$$

$$Q = S1 - S2 - S3 + S4$$

According to a still further aspect of the present invention, there is provided a synchronous detection method of detecting a target carrier wave with a constant frequency and a period (Tc) from an input signal containing the target carrier wave. The method comprises averaging the input signal each quarter of each period Tc of the target carrier wave to obtain a first moving average value (Sk), a second moving average value (Sk+1), a third moving average value (Sk+2), and a fourth moving average value (Sk+3). The first moving average value Sk of the input signal is within a range between $(k-1)Tc/4$ and $kTc/4$. The second moving average value Sk+1 of the input signal is within a range between $(k)Tc/4$ and $(k+1)Tc/4$. The third moving average value Sk+2 of the input signal is within a range between $(k+1)Tc/4$ and $(k+2)Tc/4$. The fourth moving average value Sk+3 of the input signal is within a range between $(k+2)Tc/4$ and $(k+3)Tc/4$, the k being $1, 2, \ldots, n$ (positive integer). The method comprises calculating $I_k$ and $Q_k$ in accordance with the following equations:

$$I_k = Sk + Sk+1 - Sk+2 - Sk+3$$

$$Q_k = Sk - Sk+1 - Sk+2 + Sk+3$$

The method comprises calculating an amplitude ($A_k$) of the target carrier wave and the phase $p_k$ thereof in accordance with the following equations:

$$A_k = \sqrt{I^2 + Q^2}$$

$$p_k = \arg(I_k + jQ_k) - 90 \cdot k \text{ (degrees)}$$

According to a still further aspect of the present invention, there is provided a synchronous detection method, wherein an input signal contains a plurality of carrier waves Cn ($n = 0, 1, 2, \ldots, N$) that are selected from (N+1) types of carrier waves C0, C1, C2, ..., CN (N is a positive integer) and are modulated therein, the carrier waves C0, C1, C2, ..., CN having frequencies of fc0, fc1 equal to fc0/2, fc2 equal to fc0/4, ..., fcN equal to $fc0/2^N$, respectively. The method comprises averaging the input signal over each phase range between a sum of a phase p of the carrier wave C0 and $(k \cdot 90)$ degrees and that of the phase p of the carrier wave C0 and $(k+1) \cdot 90$ degrees to obtain moving average values $S_{1+m}$, $S_{2+m}$, ..., $S_{2^{N+2}+m}$ ($m = 0, 1, 2, \ldots, N$), the k being equal to $0, 1, 2, \ldots, 2^{N+2} - 1$; calculating $I_{n,m}$ and $Q_{n,m}$ in accordance with the following equations:

$$I_{n,m} = \sum_{i=1}^{2^{N-n}} \left\{ \sum_{k=2^n(4i-4)+1}^{2^n(4i-3)} S_{k+m} + \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}$$

$$Q_{n,m} = \sum_{i=1}^{2^{N-n}} \left\{ \sum_{k=2^n(4i-4)+1}^{2^n(4i-3)} S_{k+m} - \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}; \text{ and}$$

calculating an amplitude ($A_n$) of the carrier waves Cn and the phase $p_n$ thereof in accordance with the following equations:

$$A_n = \frac{\pi f_{cn}}{2^{N-n+1}} \sqrt{I_{n,m}^2 + Q_{n,m}^2}$$

$$p_n = \arg(I_{n,m} + jQ_{n,m}) + \frac{\pi}{2^{n+1}} m$$

According to a still further aspect of the present invention, there is provided a synchronous detection method, wherein an input signal contains a plurality of carrier waves Cn (n=0, 1, 2, ..., N) that are selected from (N+1) types of carrier waves C0, C1, C2, ..., CN (N is a positive integer) and are modulated therein, and a plurality of Cn' that are selected from (N+1) types of carrier waves C0', C1', C2', ..., CN' and are modulated therein, the carrier waves C0, C1, C2, ..., CN having frequencies of fc0, fc1 equal to fc0/2, fc2 equal to fc0/4, ..., fcN equal to fc0/$2^N$, respectively, each of the carrier waves C0, C1, C2, ..., CN having a phase difference of 90 degrees from each of the carrier waves C0', C1', C2', ..., CN' at a same frequency. The method comprises averaging the input signal over each phase range between a sum of a phase p of the carrier wave C0 and (k·90) degrees and that of the phase p of the carrier wave C0 and (k+1)·90 degrees to obtain moving average values $S_{1+m}$, $S_{2+m}$, ..., $S_{2N+2+m}$ (m=0, 1, 2, ), the k being equal to 0, 1, 2, ..., $2^{N+2}-1$; calculating $I_{n,m}$ and $Q_{n,m}$ in accordance with the following equations:

$$I_{n,m} = \sum_{i=1}^{2^{N-n}} \left\{ \sum_{k=2^n(4i-4)+1}^{2^n(4i-3)} S_{k+m} + \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}$$

$$Q_{n,m} = \sum_{i=1}^{2^{N-n}} \left\{ \sum_{k=2^n(4i-4)+1}^{2^n(4i-3)} S_{k+m} - \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}$$

The method comprises outputting the calculated $I_{n,m}$ and $Q_{n,m}$ as detection results representing amplitudes of the carrier waves Cn and Cn', respectively.

According to a further aspect of the present invention, there is provided a synchronous detection device for detecting a target carrier wave from an input signal containing the target carrier wave, the target carrier wave periodically oscillating positively and negatively in time according to a constant frequency and a period. The device comprises: a moving-average unit configured to average the input signal over at least first and second phase ranges of the target carrier wave within each period thereof to obtain at least first and second moving average values of the input signal within the at least first and second phase ranges, respectively, the first phase range corresponding to a phase range within which the target carrier wave positively oscillates, the second phase range corresponding to a phase range within which the target carrier wave negatively oscillates; and a calculating unit configured to calculate a difference between the first and second moving averages as a detection result of the target carrier wave.

According to a further aspect of the present invention, there is provided a synchronous detection device for detecting a target carrier wave with a constant frequency and a period from an input signal containing the target carrier wave. The device comprises a moving-average unit configured to average the input signal each half of each period of the target carrier wave to obtain a first moving average value, a second moving average value, a third moving average value, and a fourth moving average value, the first moving average value of the input signal being within a phase range between an arbitrary phase (p) in degrees of the target carrier wave and (p+180) degrees thereof, the second moving average value of the input signal being within a phase range between (p+180) degrees of the target carrier wave and (p+360) degrees thereof, the third moving average value of the input signal being within a phase range between (p+90) degrees of the target carrier wave and (p+270) degrees thereof, the fourth moving average value of the input signal being within a phase range between (p+270) degrees and (p+450) degrees; and a calculating unit configured to calculate a first difference between the first moving average and the second moving average and a second difference between the third moving average and the fourth moving average as a detection result of the target carrier wave.

According to a further aspect of the present invention, there is provided a synchronous detection device for detecting a target carrier wave with a constant frequency and a period from an input signal containing the target carrier wave. The device comprises: a moving-average unit configured to average the input signal each quarter of each period of the target carrier wave to obtain a first moving average value (S1), a second moving average value (S2), a third moving average value (S3), and a fourth moving average value (S4), the first moving average value S1 of the input signal being within a phase range between an arbitrary phase (p) in degrees of the target carrier wave and (p+90) degrees thereof, the second moving average value S2 of the input signal being within a phase range between (p+90) degrees of the target carrier wave and (p+180) degrees thereof, the third moving average value S3 of the input signal being within a phase range between (p+180) degrees of the target carrier wave and (p+270) degrees thereof, the fourth moving average value S4 of the input signal being within a phase range between (p+270) degrees and (p+360) degrees; and a calculating unit configured to calculate I and Q representing a detection result of the target carrier wave in accordance with the following equations:

$I=S1+S2-S3-S4$ $Q=S1-S2-S3+S4$

According to a further aspect of the present invention, there is provided a synchronous detection device for detecting a target carrier wave with a constant frequency and a period (Tc) from an input signal containing the target carrier wave. The device comprises a moving-average unit configured to average the input signal each quarter of each period Tc of the target carrier wave to obtain a first moving average value (Sk), a second moving average value (Sk+1), a third moving average value (Sk+2), and a fourth moving average value (Sk+3), the first moving average value Sk of the input signal being within a range between (k−1)Tc/4 and kTc/4, the second moving average value Sk+1 of the input signal being within a range between (k)Tc/4 and (k+1)Tc/4, the third moving average value Sk+2 of the input signal being within a range between (k+1)Tc/4 and (k+2)Tc/4, the fourth moving average value Sk+3 of the input signal being within a range between $(k+2)Tc/4$ and $(k+3)Tc/4$, the k being 1, 2, ..., n (positive integer); a calculating unit configured to calculate $I_k$ and $Q_k$ in accordance with the following equations:

$$I_k = Sk + Sk+1 - Sk+2 - Sk+3$$

$$Q_k = Sk - Sk+1 - Sk+2 + Sk+3$$

and configured to calculating an amplitude ($A_k$) of the target carrier wave and the phase $p_k$ thereof in accordance with the following equations:

$$A_k = \sqrt{I^2 + Q^2}$$

$$p_k = \arg(I_k + jQ_k) - 90 \cdot k \text{ (degrees)}$$

According to a further aspect of the present invention, there is provided a synchronous detection device, wherein an input signal contains a plurality of carrier waves Cn (n=0, 1, 2, ..., N) that are selected from (N+1) types of carrier waves C0, C1, C2, ..., CN (N is a positive integer) and are modulated therein, the carrier waves C0, C1, C2, ..., CN having frequencies of fc0, fc1 equal to fc0/2, fc2 equal to fc0/4, ..., fcN equal to $fc0/2^N$, respectively. The device comprises a moving-average unit configured to average the input signal over each phase range between a sum of a phase p of the carrier wave C0 and (k·90) degrees and that of the phase p of the carrier wave C0 and (k+1)·90 degrees to obtain moving average values $S_{1+m}, S_{2+m}, \ldots, S_{2N+2+m}$ (m=0, 1, 2, ), the k being equal to 0, 1, 2, ..., $2^{N+2}-1$; and a calculating unit configured to calculating $I_{n,m}$ and $Q_{n,m}$ in accordance with the following equations:

$$I_{n,m} = \sum_{i=1}^{2^{N-n}} \left\{ \sum_{k=2^n(4i-4)+1}^{2^n(4i-3)} S_{k+m} + \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}$$

$$Q_{n,m} = \sum_{i=1}^{2^{N-n}} \left\{ \sum_{k=2^n(4i-4)+1}^{2^n(4i-3)} S_{k+m} - \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}$$

and configured to calculating an amplitude ($A_n$) of the carrier waves Cn and the phase $p_n$ thereof in accordance with the following equations:

$$A_n = \frac{\pi f_{cn}}{2^{N-n+1}} \sqrt{I_{n,m}^2 + Q_{n,m}^2}$$

$$p_n = \arg(I_{n,m} + jQ_{n,m}) + \frac{\pi}{2^{n+1}} m$$

According to a further aspect of the present invention, there is provided a synchronous detection device, wherein an input signal contains a plurality of carrier waves Cn (n=0, 1, 2, ..., N) that are selected from (N+1) types of carrier waves C0, C1, C2, ..., CN (N is a positive integer) and are modulated therein, and a plurality of Cn' that are selected from (N+1) types of carrier waves C0', C1', C2', ..., CN' and are modulated therein, the carrier waves C0, C1, C2, ..., CN having frequencies of fc0, fc1 equal to fc0/2, fc2 equal to fc0/4, ..., fcN equal to $fc0/2^N$, respectively, each of the carrier waves C0, C1, C2, ..., CN having a phase difference of 90 degrees from each of the carrier waves C0, C1, C2, ..., at a same frequency. The device comprises a moving-average unit configured to input signal over each phase range between a sum of a phase p of the carrier wave C0 and (k·90) degrees and that of the phase p of the carrier wave C0 and (k+1)·90 degrees to obtain moving average values $S_{1+m}, S_{2+m}, \ldots, S_{2N+2+m}$ (m=0, 1, 2, ), the k being equal to 0, 1, 2, ..., $2^{N+2}-1$;

a calculating unit configured to calculate $I_{n,m}$ and $Q_{n,m}$ in accordance with the following equations:

$$I_{n,m} = \sum_{i=1}^{2^{N-n}} \left\{ \sum_{k=2^n(4i-4)+1}^{2^n(4i-3)} S_{k+m} + \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}$$

$$Q_{n,m} = \sum_{i=1}^{2^{N-n}} \left\{ \sum_{k=2^n(4i-4)+1}^{2^n(4i-3)} S_{k+m} - \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\} \text{ and}$$

configured to output the calculated $I_{n,m}$ and $Q_{n,m}$ as detection results representing amplitudes of the carrier waves Cn and Cn', respectively.

BRIEF DESCRIPTION OF THE DRAWINGS

Other objects and aspects of the invention will become apparent from the following description of embodiments with reference to the accompanying drawings in which:

FIG. 1A is a block diagram for explaining a structure of a synchronous detection device and input and output signals with respect to the synchronous detection device according to a first embodiment of the invention;

FIG. 1B is a block diagram for explaining the structure of the synchronous detection device and input and output signals with respect to the synchronous detection device in detail according to the first embodiment of the invention;

FIG. 2B is a waveform chart indicative of a waveform of an input signal containing a target carrier wave according to the first embodiment of the invention;

FIG. 2C is a waveform chart indicative of a waveform of an input signal containing the target carrier wave and a DC component according to the first embodiment of the invention;

FIG. 9 is a waveform chart indicative of waveforms of signal components whose frequencies are 12's common submultiples of the frequency of the target carrier wave when the phase thereof is 90 degrees according to the second embodiment of the invention;

FIG. 19A is a block diagram for explaining a structure of a conventional synchronous detection device; and FIG. 19B is a block diagram for explaining the structure of the synchronous detection device illustrated in FIG. 19A.

DETAILED DESCRIPTION OF EMBODIMENTS OF THE INVENTION

Figure 2A:
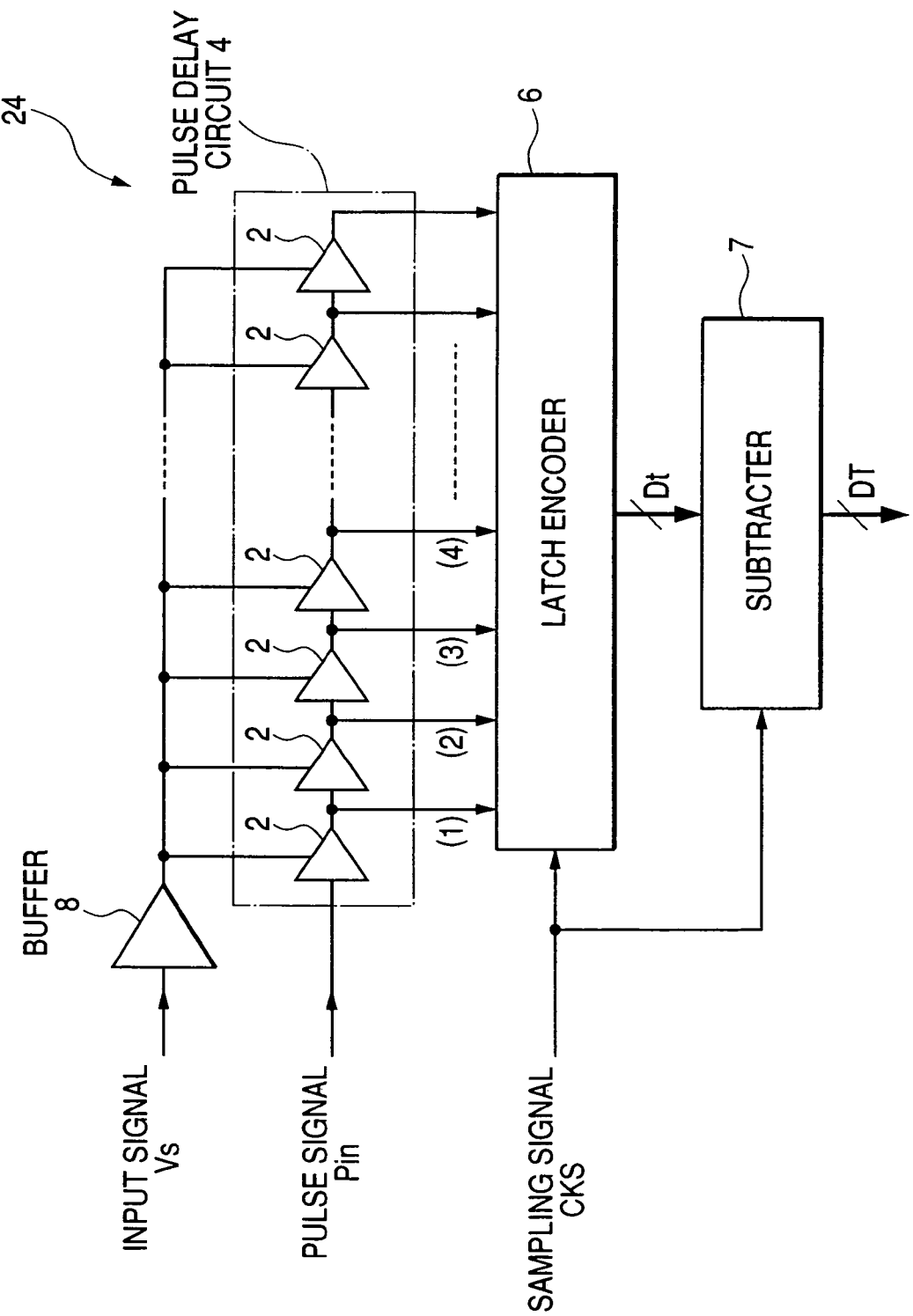
FIG. 2A is a block diagram for explaining the structure of the moving-average circuit shown in FIG. 1B according to the first embodiment of the invention.

Embodiments of the invention will be described hereinafter with reference to the accompanying drawings.

First Embodiment

FIGS. 1A and 1B are block diagrams for explaining the structure of a synchronous detection device 1 and input and output signals with respect to the synchronous detection device 1 according to a first embodiment of the invention.

The synchronous detection device 1 is used for reducing at least one carrier wave and a DC component, which are components to be eliminated, from an input signal Vs including a target carrier wave, such as a periodic wave Wt periodically oscillating positively and negatively in time with respect to a undisturbed position (axis) Dc. The undisturbed position is referred to as "center axis". Such a carrier wave except for the target wave, which is to be eliminated, is referred to as "an unwanted carrier wave" herein after.

As shown in FIGS. 1A and 1B, the synchronous detection device 1 has a synchronization detection circuit 10.

The synchronization detection circuit 10 is provided with a multiple circuit 22. The multiple circuit 22 is operative to generate, from a clock signal CK with a constant frequency that is the same with a constant frequency fc of the target carrier wave Wt, a sampling signal CKS. The sampling signal CKS has a frequency double of the frequency fc of the clock signal CK, which is represented as (2×fc).

The synchronous detection device 1 is also provided with a moving-average circuit 24, which corresponds to a moving-average unit related to the present invention. Incidentally, the clock signal CK is sent to other components of the synchronous detection circuit 10 in order to drive them.

The moving-average circuit 24 is operative to obtain a moving-average value DT of an input signal Vs over each period Tc, which is equal to (1/fc), of the sampling signal CKS, in other words, each half period (Tc/2) of the target carrier wave Wt. The moving-average circuit 24 is also operative to sequentially output the moving-average values DT generated over each period of the sampling signal CKS.

The synchronous detection circuit 10 is provided with a first register 26 operative to sequentially latch the moving-average values DT outputted from the moving-average circuit 24 so as to output a previously latched moving-average value DT.

The synchronous detection circuit 10 is also provided with a second register 28 operative to sequentially latch the moving-average values DT outputted from the first register 26 so as to output a previously latched moving-average value DT.

The synchronous detection circuit 10 is provided with a subtracting circuit 30 operative to calculate a difference value between the moving-average value currently latched in the first register 26 and the moving-average value currently latched in the second register 28 and previously latched in the first register 26 in synchronization with the clock signal CK.

The moving-average value currently latched in the first register 26 is referred to as "second moving-average value D2" and the moving-average value previously latched in the second register 28 is referred to as "first moving-average value D1". In this case, the subtracting circuit 30 calculates the difference value (D1−D2) between the first moving-average value D1 and the second moving-average value D2.

The synchronous detection circuit 10 is provided with a third register 32 operative to sequentially latch the calculated values of the subtracting circuit 30 so as to output a previously latched calculated value as digital data Do1 representing a detection result of the target carrier wave Wt.

The moving-average circuit 24 is composed of what is called a time analog to digital (A/D) converter (TAD).

Specifically, as shown in FIG. 2A, the moving-average circuit 24 according to the first embodiment is provided with a pulse delay circuit 4. The pulse delay circuit 4 has a plurality of delay units 2 that corresponds to a plurality of stages of delay. The delay units 2 are serially connected to one another in a cascade. When a pulse signal Pin is inputted to the pulse delay circuit 4, each of the delay units 2 is operative to delay the pulse signal Pin at a predetermined delay time so as to output the delayed pulse signal Pin.

The moving-average circuit 24 is also composed of a latch encoder 6 operative to detect a position at which the inputted pulse signal Pin has reached in the pulse delay circuit 4 at each rising edge (or falling edge) of the sampling signal CKS to latch it.

The latch encoder 6 is also operative to convert each of the latched positions of the pulse signal P at each of the leading edges of the sampling signal CKS into predetermined bits of digital data Dt so as to output it.

The digital data Dt represents what number of stage (delay unit 2) through which the pulse signal Pin located at each of the latched positions lastly passes from the head of the stages (delay units 2).

The moving-average circuit 24 is also composed of a subtractor 7 operative to sequentially receive pieces of the digital data Dt which are outputted from the latch encoder 6 at respective rising edges of the sampling signal CKS and to latch them.

The subtractor 7 is also operative to calculate a difference value between one piece of the digital data Dt that is currently latched in the subtractor 7 and another one piece thereof that is previously latched in the subtractor 7. The subtractor 7 is also operative to calculate, according to the difference value, digital data DT representing a relative difference of the number of the delay units 2 through which the pulse signal Pin passes over each period of the sampling signal CKS.

In this first embodiment, the latch encoder 6 and the subtractor 7 correspond to a count unit according to the present invention.

Each of the delay units 2 constituting the pulse delay circuit 4 is provided with a gate circuit composed of, for example, an inverter. The moving-average circuit 24 has a buffer 8 to which an input signal, such as voltage signal Vs with a predetermined voltage level, is inputted. The input signal Vs is applied to each of the delay units 2 through the buffer 8 as a drive voltage.

Incidentally, as some examples of each of the delay units 2, U.S. Pat. No. 6,771,202B2 teaches two stages of CMOS inverters, and so on, the disclosure of which is incorporated totally herein by reference.

Next, overall operations of the synchronous detection device 1 will be explained hereinafter.

The input signal Vs including the target carrier wave Wt is inputted to the moving-average circuit 24 of the synchronous detection circuit 10.

Each of the delay units (gate circuits) 2 of the moving-average circuit 24 delays the pulse signal Pin by the predetermined delay time, and the voltage level of the input signal Vs changes the delay time of each of the delay units 2. In other words, the delay time of each of the delay units 2 corresponds to the voltage level of the input signal Vs.

This feature provides that the relative change of the number of the delay units 2 through which the pulse signal Pin runs within each period of the sampling signal CKS, which is calculated as the digital data DT outputted from the moving-average circuit 24, represents an average value of the voltage level of the input signal Vs over each period of the sampling signal CKS.

The voltage level of the input signal Vs is averaged over each period of the sampling signal CXS in the pulse delay circuit 4 so that the average value is obtained. Each period of the sampling signal CKS corresponds to each half period (Tc/2) of the clock signal CK corresponding to each half period (Tc/2) of the target carrier wave Wt.

The pieces of the digital data DT, which are outputted from the moving-average circuit 24 over each period of the clock signal CK, are sequentially latched in the second and first registers 28 and 26 as fist digital data corresponding to the first moving-average value D1 and second digital data corresponding to the second moving-average value D2, respectively.

Specifically, it is assumed that the target carrier wave Wt, which is periodically oscillated positively and negatively with respect to the center axis Dc, is only contained in the input signal Vs on which no DC components are superimposed so that the value of the center axis Dc is set to "0".

As shown in FIG. 2B, the first digital data D1 previously stored in the second register 28 represents the first moving-average value that is obtained by averaging the input signal Vs over the phase range between 0 degrees (0 radian) and 180 degrees ($\pi$ radian) corresponding to the half period (Tc/2) of the target carrier wave Wt. In other words, the first moving-average value is represented as a first area Sa obtained by integrating the input signal Vs over the phase range between 0 degrees and 180 degrees. The half period (Tc/2) of the target carrier wave Wt is referred to as "moving-average period Ts".

Similarly, the second digital data D2 currently stored in the first resister 26 represents the second moving-average value that is obtained by averaging the input signal Vs over the phase range between 180 degrees ($\pi$ radian) and 360 degrees ($2\pi$ radian) corresponding to the half period (Tc/2) of the target carrier wave Wt (moving-average period Ts). In other words, the second moving-average value is represented as a second area Sb obtained by integrating the input signal Vs over the phase range between 180 degrees and 360 degrees.

The difference value (D1−D2) between the first digital data D1 and the second digital data D2 is calculated by the subtracting circuit 30 so that the digital data Do1 indicative of the difference value (D1−D2) is outputted from the synchronous detection circuit 10.

As shown in FIG. 2B, the first area Sa is formed by the positive wave Wt over each period Tc, making it possible to synchronously detect the target carrier wave Wt with a high accuracy.

Moreover, in the first embodiment, the synchronous detection circuit 10 allows, even if the target carrier wave Wt is contained in the input signal Vs on which a DC component is superimposed, the digital data Do1 corresponding to the target carrier wave Wt to be synchronously detected independently from the superimposed DC component.

That is, as shown in FIG. 2C, the center axis Dc of the target carrier wave Wt is offset by the DC component superimposed on the input voltage Vs so that the target carrier wave Wt is periodically oscillated with respect to the offset center axis having the offset level. The first moving-average value is represented as a third area Sc obtained by integrating the input signal Vs over the phase range between 0 degrees and 180 degrees. The third area Sc is composed of an area Sc1 formed between the input signal Vs and the offset center axis Dc and an area Sc2 formed between the offset center axis Dc and an axis corresponding to "0" value. Similarly, the second moving-average value is represented as a fourth area Sd obtained by integrating the input signal Vs over the phase range between 180 degrees and 360 degrees.

In this case, the first digital data D1 corresponding to the third area Sc of the input voltage Vs over the phase range between 0 degrees and 180 degrees of the target carrier wave Wt is obtained as positive value (+) to be sent to the subtracting circuit 30. Similarly, the second digital data D2 corresponding to the fourth area Sd of the input voltage Vs over the phase range between 180 degrees and 360 degrees of the target carrier wave Wt is obtained as positive value (+) to be sent to the subtracting circuit 30.

The digital data Do1 corresponding to the difference value between the positive moving-average value +D1 including the offset DC component and the positive moving-average value +D2 including the offset DC component, which is represented as "+D1−(+D2)=D1−D2", is calculated by the subtracting circuit 30. That is, the subtraction between the moving-average values D1 and D2 allows the DC offset component on the moving-average value D1 and that on the moving-average value D2 to be canceled each other out.

The digital data Do1 calculated as the value "D1−D2", therefore, corresponds to the peak-to-peak amplitude of the target carrier wave Wt, malting it possible to synchronously detect the target carrier wave Wt with a high accuracy.

In other words, the digital data Do1 corresponding to the difference value between the third area Sc and the fourth area Sd, which is represented as "Sc−(Sd)=Sc1+(Sc2−Sd)=Sc1+Se", is calculated by the subtracting circuit 30. The reference character Se represents an area formed between the input voltage Vs and the center axis Dc within the phase range between 180 degrees and 360 degrees of the target carrier wave Wt. The digital data Do1 calculated as the value "Sc1+Se" corresponds to the total area of the target carrier wave Wt within each period Tc, making it possible to synchronously detect the target carrier wave Wt with a high accuracy independently from the offset of the center axis Dc.

When an unwanted carrier wave to be eliminated except for the target carrier wave Wt is contained in the input signal Vs in addition to the target carrier wave Wt, a digital filter 12 may be provided at the output side of the synchronous detection circuit 10 (see the dashed line in FIG. 1A). The digital filter 12 is operative to absorb fluctuations in the digital data Do1, which result from the unwanted carrier wave. Specifically, the digital filter 12 is operative to execute integration processes with respect to the digital data Do1 or averaging processes therewith to generate digital data Do2, thereby outputting the digital data Do2 as data indicative of the result of the detection of the synchronous detection device 1.

In the first embodiment, however, when the unwanted carrier wave has, for example, a frequency double of the frequency fc of the target wave wt, which is represented as "Wc" in FIG. 1B, the synchronous detection circuit 10 allows the signal components of the unwanted carrier wave Wc to be automatically eliminated as noise components.

The synchronous detection circuit 10 permits the unwanted carrier wave Wc, which has one of predetermined frequencies related to the frequency fc of the target carrier wave Wt, to be automatically eliminated by the moving-average processes of the moving-average circuit 24 and the subtracting processes of the subtracting circuit 30. The synchronous detection device 1, therefore, can execute synchronous detection of the input signal Vs with a high accuracy.

For example, the input signal Vs containing the unwanted carrier wave Wc and the DC component, which are to be eliminated, is inputted to the synchronous detection circuit 10. The noise components corresponding to the unwanted carrier wave Wc and the DC component are automatically eliminated by the synchronous detection circuit 10 so that the digital data Do1 corresponding to the target carrier wave Wt is detected in response to the clock signal CK synchronized with the target carrier wave Wt. (see FIG. 1B).

Figure 3:
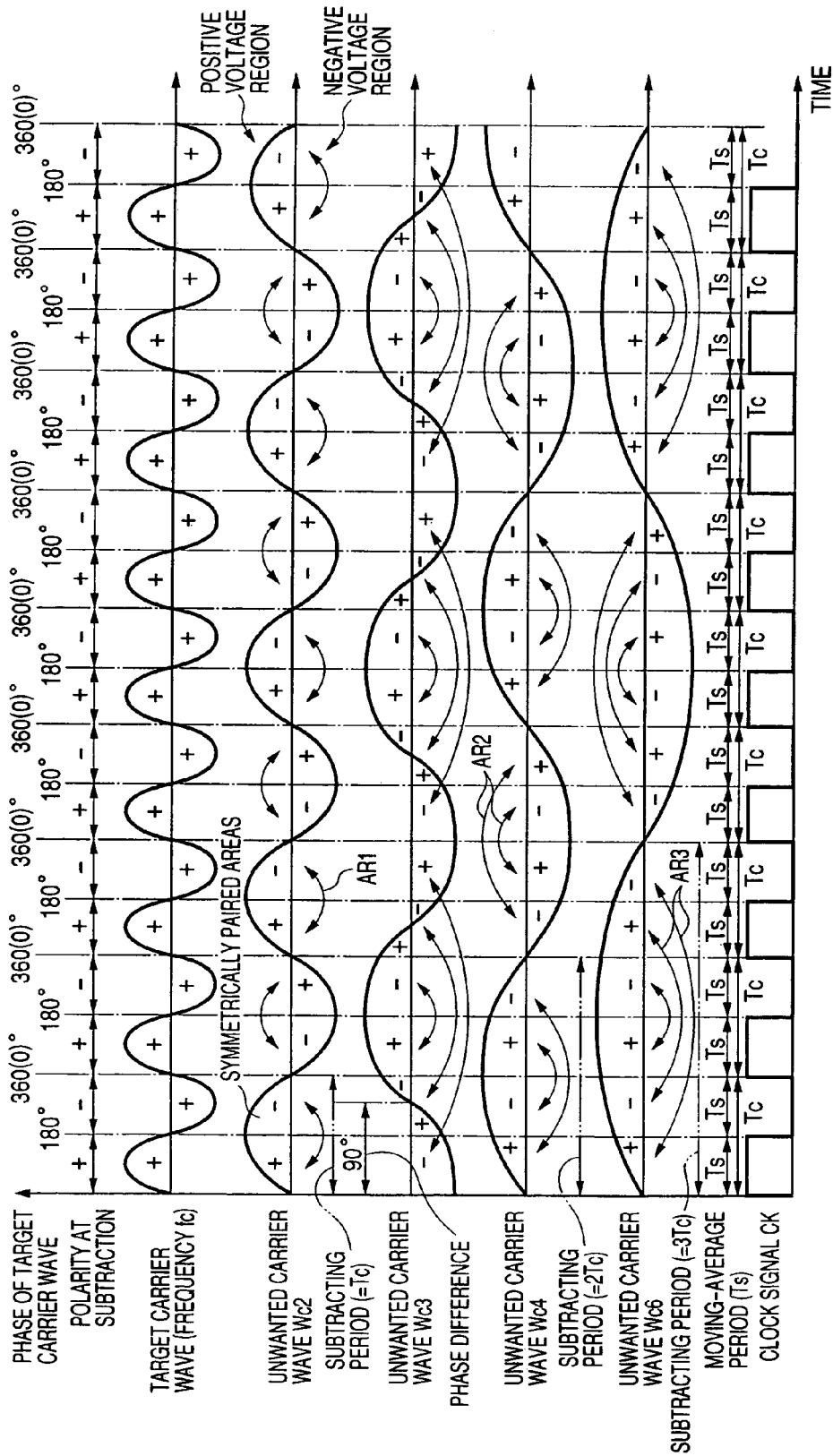
FIG. 3 is a waveform chart indicative of waveforms of input signals that a synchronous detection circuit shown in FIG. 1B can detect according to the first embodiment of the invention.

Specifically, as shown in FIG. 3, it is assumed that the unwanted carrier wave Wc contained in the input signal Vs except for the target carrier wave Wt has a frequency that is an even submultiple of the frequency fc of the target carrier wave Wt, such as "fc/2", "fc/4", "fc/6" or the like. As shown in FIG. 3, each of the positive voltage regions of the unwanted carrier wave Wc having the frequency that is the even submultiple of the frequency fc is divided into at least one symmetrical pair of areas at each moving-average period Ts. Paired characters "+" and "−" are assigned to the at least one symmetrically paired areas, respectively. The at least one symmetrically paired areas, which are connected to each other by an arrow AR1, can be canceled each other out.

Similarly, each of the negative voltage regions of the unwanted carrier wave Wc having the frequency that is the even submultiple of the frequency fc is divided into at least one symmetrical pair of areas at each of the moving-average periods Ts. Paired characters "+", and "−" are assigned to the at least one symmetrically paired areas, respectively. The at least one symmetrically paired areas, which are connected to each other by an arrow AR2, can be canceled each other out.

When the unwanted carrier wave Wc having the frequency that is the even submultiple of the frequency fc is contained in the input signal Vs, the subtracting circuit 30 calculates the difference between the sum of the moving-average values D1 and that of the moving-average values D2. The moving-average values D1 and the moving-average values D2 are obtained by the moving-average circuit 24 over a predetermined subtracting period corresponding to at least one period Tc of the target carrier wave Wt, and the predetermined subtracting period is determined by the subtracting circuit 30 according to the frequency of the unwanted carrier wave Wc.

That is, when the unwanted carrier wave Wc2 having the frequency (fc/2) half of the frequency fc of the target carrier wave Wt is contained in the input signal Vs (see FIG. 3), the subtracting period is determined to correspond to each period Tc of the target carrier wave Wt. The moving-average value D2 of the unwanted carrier wave Wc2 obtained over the subtracting period of "Tc" is subtracted from the moving-average value D1 thereof obtained over the subtracting period of "Tc" so that the moving-average values D1 and D2 of the unwanted carrier wave Wc2, which correspond to the symmetrically paired areas ("+" and "−"), are canceled each other out.

In contrast, it is assumed that the unwanted carrier wave Wc4 having the frequency (fc/4) quarter of the frequency fc of the target carrier wave Wt or the frequency (fc/6) one-sixth thereof is contained in the input signal Vs (see FIG. 3). In this assumption, if the subtracting period is determined to correspond to each period Tc of the target carrier wave Wt, some components of the unwanted carrier wave Wc4 or Wc6 would remain in the input signal Vd.

In the first embodiment, however, when the unwanted carrier wave Wc4 having the frequency (fc/4) quarter of the frequency fc of the target carrier wave Wt is contained in the input signal Vs, the subtracting period is determined to correspond to the double of the period Tc of the target carrier wave Wt, represented as "2Tc". The sum of the moving-average values D2 of the unwanted carrier wave Wc4 obtained over the subtracting period of "2Tc" is subtracted from the sum of the moving-average values D1 thereof obtained over the subtracting period of "2Tc" so that the moving-average values D1 and D2 of the unwanted carrier wave Wc4 are canceled each other out.

Similarly, when the unwanted carrier wave Wc6 having the frequency (fc/6) one-sixth of the frequency fc of the target carrier wave Wt is contained in the input signal Vs, the subtracting period is determined to correspond to the triple of the period Tc of the target carrier wave Wt, represented as "3Tc". The sum of the moving-average values D2 of the unwanted carrier wave Wc6 obtained over the subtracting period of "3Tc" is subtracted from the sum of the moving-average values D1 thereof obtained over the subtracting period of "3Tc" so that the moving-average values D1 and D2 of the unwanted carrier wave Wc6 are canceled each other out.

When the unwanted carrier wave has a frequency that is an even submultiple "n" of the frequency fc, it is preferable to set the subtracting period to "n/2" times the period Tc of the target carrier wave Wt.

In addition, it is assumed that the unwanted carrier wave Wc has a frequency that is an odd submultiple of the frequency fc of the target carrier wave Wt, such as "fc/3" (see FIG. 3). In this assumption, when the unwanted carrier wave Wc having the frequency that is an odd submultiple of the frequency fc of the target carrier wave Wt, referred to as "Wc3", has a phase difference of 90 degrees at the unwanted carrier wave's frequency with respect to the target carrier wave (see the unwanted carrier wave Wc3 in FIG. 3), the symmetrically paired areas ("+" and "−"), which are connected by arrows AR3 of the unwanted carrier wave Wc3, are canceled each other out.

That is, when the unwanted carrier wave has a frequency that is an odd submultiple "m" of the frequency fc, and has a phase difference of 90 degrees at the unwanted carrier wave's frequency with respect to the target carrier wave Wt, it is preferable to set the subtracting period to "m" times the period Tc of the target carrier wave Wt. For example, when the unwanted carrier wave Wc has a frequency that is the odd submultiple "3" of the frequency fc, which is referred to as "Wc3" and has a phase difference of 90 degrees at the unwanted carrier wave's frequency with respect to the target carrier wave Wt, the subtracting period is set to "3" times the period Tc of the target carrier wave Wt. In this example, the sum of the moving-average values D2 of the unwanted carrier wave Wc3 obtained for the subtracting period of "3Tc" is subtracted from the sum of the moving-average values D1 thereof obtained over the subtracting period of "3Tc". This allows the moving-average values D1 and D2 of the unwanted carrier wave Wc3 to be canceled each other out.

Figure 4:
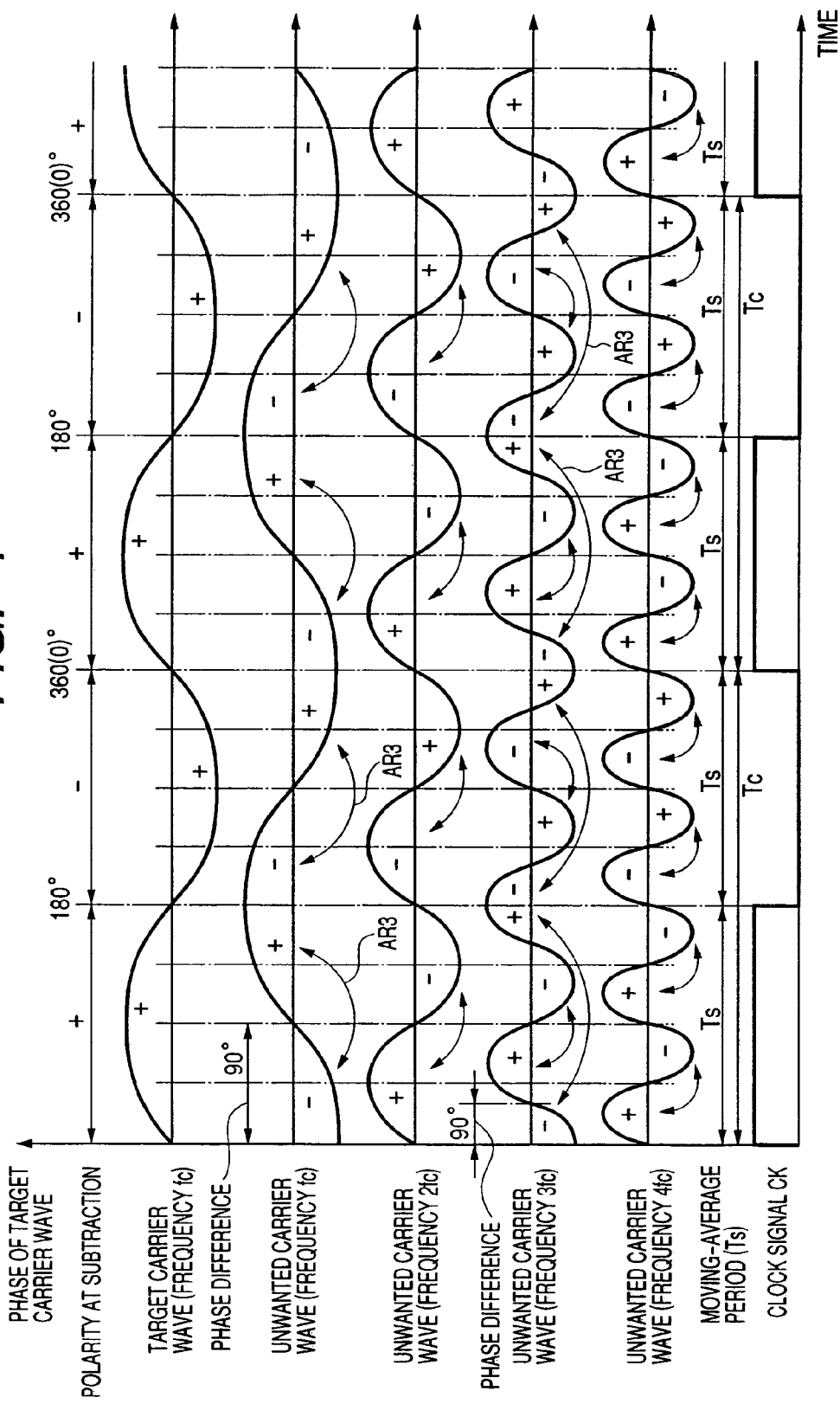
FIG. 4 is a waveform chart indicative of waveforms of input signals that the synchronous detection circuit can detect according to the first embodiment of the invention.

As shown in FIG. 4, when the unwanted carrier wave has a frequency that is an even multiple of the frequency fc of the target carrier wave Wt, such as 2×fc, 4×fc, each of the positive voltage regions of the unwanted carrier wave is divided into symmetrical pairs of areas at each moving-average period Ts. Each moving-average period corresponds to a period half of the period Tc of the target carrier wave Wt. Similarly, each of the negative voltage regions of the unwanted carrier wave is divided into symmetrical pairs of areas at each moving-average period Ts corresponding to the half of the period Tc of the target carrier wave Wt.

Paired characters "+" and "−" are assigned to the symmetrically paired areas, respectively. The symmetrically paired areas, which are connected to each other by arrows AR3, respectively, can be canceled each other out every moving-average periods Ts corresponding to the half of the period Tc of the target carrier wave Wt. Obtaining the difference between the first and second moving-average values D1 and D2 detected over each period Tc of the target carrier wave Wt allows the unwanted carrier waves Wc to be canceled and the target carrier wave Wt to be detected.

In addition, as shown in FIG. 4, it is assumed that the unwanted carrier wave Wc has a frequency that is equal to the frequency fc of the target carrier wave Wt or that is an odd multiple of the frequency fc, such as 1fc, 3fc, ...). In this case, when the unwanted carrier wave Wc has a phase difference of 90 degrees at the unwanted carrier wave's frequency with respect to the target carrier wave (see FIG. 4), the symmetrically paired areas ("+" and "−"), which are connected by arrows AR3 of the unwanted carrier wave Wc3, are canceled each other out every moving-average periods Ts corresponding to the half of the period Tc of the target carrier wave Wt.

That is, when the unwanted carrier wave Wc has a frequency that is an odd number times the frequency fc, and has a phase difference of 90 degrees at the unwanted carrier wave's frequency with respect to the target carrier wave Wt, obtaining the difference between the first and second moving-average values D1 and D2 detected over each period Tc of the target carrier wave Wt allows the unwanted carrier waves Wc to be canceled and the target carrier wave Wt to be detected.

It is assumed that the frequency of the unwanted carrier wave Wc is an integral multiple of the frequency fc of the target carrier wave Wt. In this assumption, subtraction of the sum of the moving-average values D1 obtained over two or more periods of the target carrier wave Wt from that of the moving-average values D2 obtained thereover allows the unwanted carrier wave Wc to be canceled and detection result corresponding to the target carrier wave Wt to be obtained.

Using the synchronous detection circuit 10 to obtain the difference value between the first and second moving-average values of the input signal Vs permits the signal components of the target carrier wave Wt to be extracted with high accuracy in cases of any one of unwanted carrier waves or a combination thereof represented as the following (1) to (6):

(1) an unwanted carrier wave having a frequency equal to the frequency fc of the target carrier wave Wt and a phase difference of approximately 90 degrees at the unwanted carrier wave's frequency with respect to the target carrier wave;

(2) an unwanted carrier wave whose frequency is an even multiple of the frequency fc of the target carrier wave Wt;

(3) an unwanted carrier wave whose frequency is an even submultiple of the frequency fc of the target carrier wave Wt;

(4) an unwanted carrier wave having a frequency that is an odd multiple of the frequency fc of the target carrier wave Wt and having a phase difference of approximately 90 degrees at the unwanted carrier wave's frequency with respect to the target carrier wave Wt;

(5) an unwanted carrier wave having a frequency that is an odd submultiple of the frequency fc of the target carrier wave Wt and having a phase difference of approximately 90 degrees at the unwanted carrier wave's frequency with respect to the target carrier wave Wt;

(6) an unwanted carrier wave having a frequency that is obtained by multiplying the frequency fc of the target carrier wave Wt by a rotational number except for odd numbers.

As described above, in the synchronous detection device 1 according to the first embodiment, the time A/D converter (TAD) having the pulse delay circuit 4 constitutes the moving-average circuit 24 as a moving-average unit. The moving-average circuit 24 calculates the moving-average value D1 of the input signal Vs over the phase range between 0 degrees and 180 degrees and the moving-average value D2 thereof over the phase range between 180 degrees and 360 degrees. The subtracting circuit 30 calculates the difference value between the moving-average values D1 and D2, thereby calculating the digital data Do1 indicative of the result of the detection based on the difference value.

This structure has the advantage that there is no need to amplify the input signal Vs by using an analog amplifier, making it possible to prevent noise components caused by the amplifying operations of the analog amplifier from being superimposed on the result of the detection. This results in a higher accuracy of the synchronous detection of the synchronous detection device 1 as compared with conventional synchronous detection devices.

In addition, various types of gate circuits allow the synchronous detection circuit 10 according to the first embodiment to be completely digitized, which allows, when implementing the synchronous detection circuit 10 in a chip, the footprint of the synchronous detection circuit 10 in the chip to be reduced, thereby reducing the synchronous detection device 1 in size and in cost.

The synchronous detection circuit 10 according to the first embodiment has no analog amplifying circuits whose parts are susceptible to environmental changes around the circuit 10, which allows the environmental resistance of the synchronous detection circuit 10 to be improved. This advantage further permits the synchronous detection circuit 10 to stably detect the input signal Vs in synchronization with the target carrier wave Wt, making it possible to improve the reliability of the synchronous detection device 1.

In the first embodiment, the pulse delay circuit 4 constituting the moving-average circuit 24 is serially connected to one another in a cascade, but the present invention is not limited to the structure.

Figure 5:
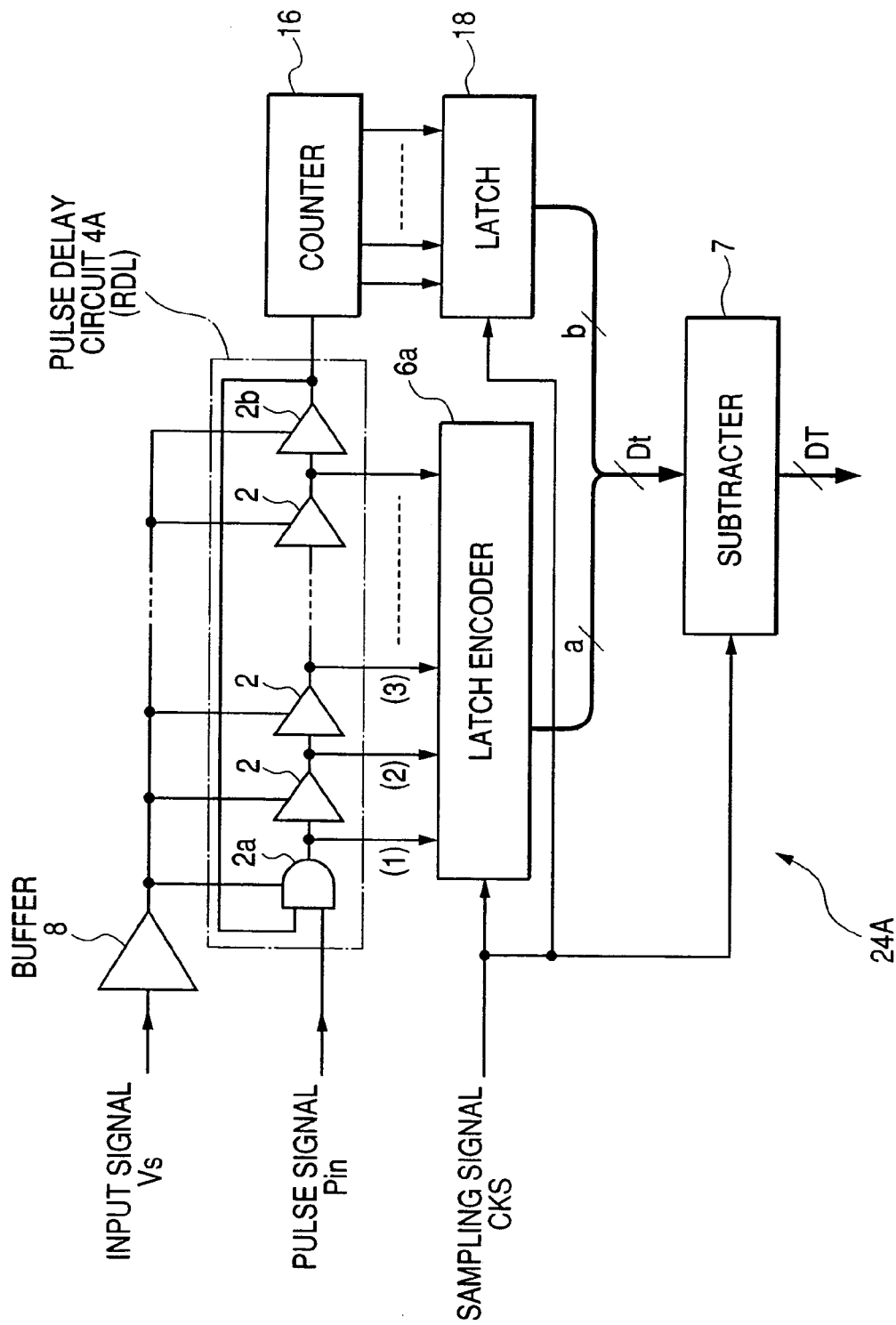
FIG. 5 is a block diagram indicative of a modification of the moving-average circuit shown in FIG. 2A.

That is, as shown in FIG. 5, a pulse delay circuit 4A, as a modification of the pulse delay circuit 4 shown in FIG. 2, is composed of an AND gate 2a in place of the first stage of the delay units 2 of the pulse delay circuit 4A. The AND gate has one and the other input terminals, and the one input terminal is served as a start terminal to which a start pulse signal is inputted. The other input terminal and an output terminal of final stage 2b of the delay units 2 are connected to each other so that the delay units 2 are serially connected to have a ring-like structure, thereby constituting the pulse delay circuit 4A as a ring delay line RDL.

The moving-average circuit 24 also has a counter 16 connected to the output terminal of the final stage 2b and operative to count the number of times of circulation of the pulse signal Pin through the circularly connected delay units 2. The moving-average circuit 24 further has a latch circuit 18 operative to detect a count value by the counter 16 at each rising edge (or falling edge) of the sampling signal CKS to latch it.

In this modification, a latch encoder 6a converts each of the latched positions of the pulse signal P at each of the leading edges of the sampling signal CKS into predetermined lower-order bits of digital data "a" so as to output it to the subtractor 7a.

The latch 18 converts the latched count value into predetermined higher-order bits of digital data "b", thereby outputting it to the subtractor 7a. The lower-order bits of digital data "a" and the higher-order bits of digital data "b" are combined to be inputted to the subtractor 7 as the digital data Dt.

The structure of the moving-average circuit 24A allows the pulse signal Pin to circulate through the ring-connected delay units 2 in the pulse delay circuit 4a so that the pieces of digital data Dt are sequentially repeatedly generated to be sent to the subtractor 7. This feature of the moving-average circuit 24A permits the number of the delay units 2 constituting the pulse delay circuit 4A to decrease as compared with the moving-average circuit 24 shown in FIG. 2A.

In the first embodiment, the time A/D converter (TAD) having the pulse delay circuit 4 constitutes the moving-average circuit 24. However, the present invention is not limited to the structure. A moving-average circuit as another example of the moving-average circuit 24 may be operative to convert the input signal Vs into the digital data at a predetermined sampling frequency sufficiently larger than the frequency fc of the target carrier wave Wt to latch the converted digital data.

When the predetermined number of pieces of the digital data have been latched, the moving-average circuit as another example of the moving-average circuit 24 may be operative to average the predetermined number of pieces of the digital data to obtain the first digital data (first moving-average value) D1 and the second digital data (second moving average value) D2.

Second Embodiment

Figure 6:
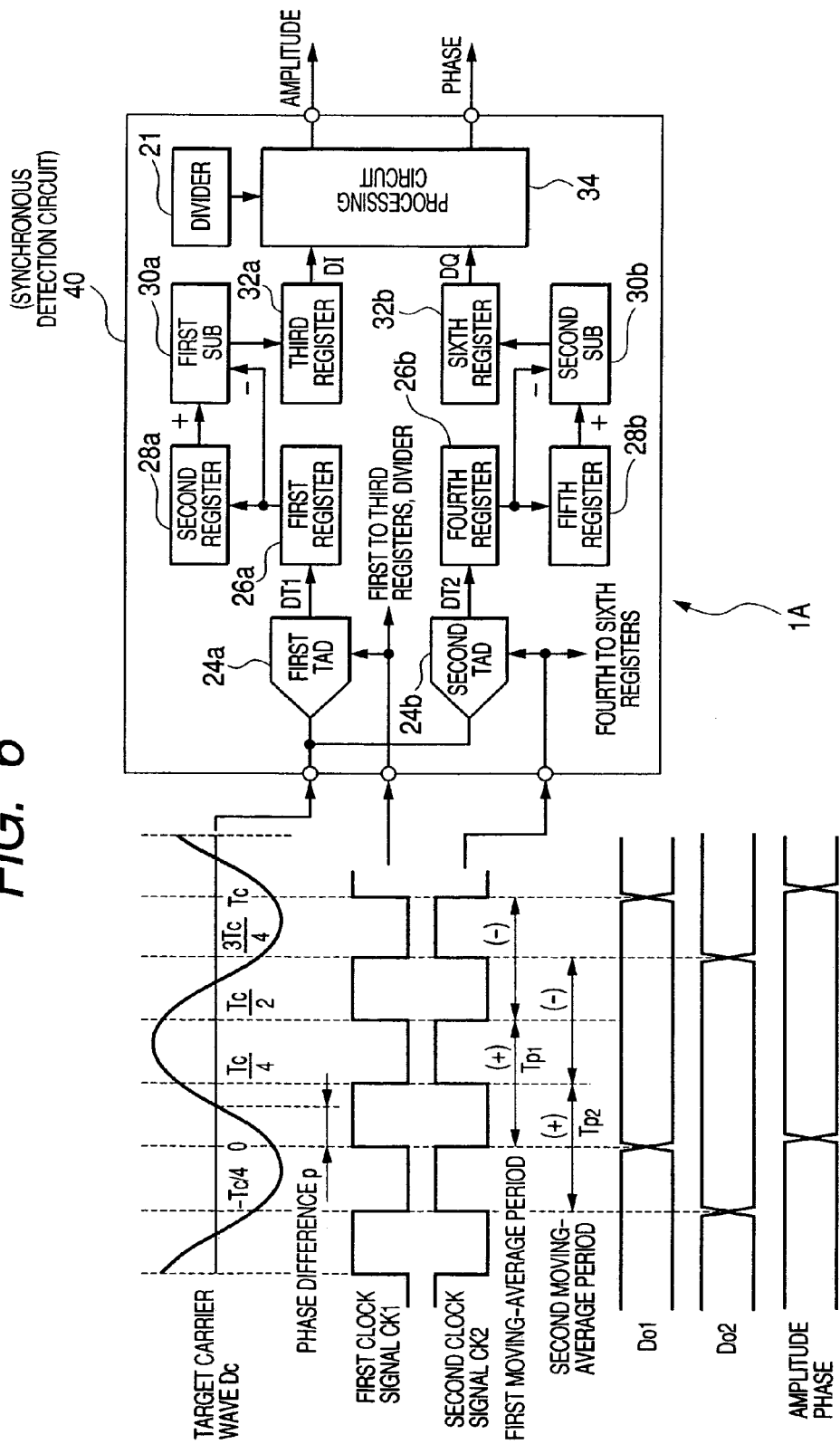
FIG. 6 is a block diagram for explaining a structure of a synchronous detection device and input signals with respect to the synchronous detection device according to a second embodiment of the invention.

As shown in FIG. 6, a synchronous detection device 1A according to a second embodiment is provided with a synchronous detection circuit 40 that operates in response to first and second clock signals CK1 and CK2. Each of the first and second clock signals CK1 and CK2 has a frequency (2×fc) double of a frequency fc of a target carrier wave S(t), such as a periodic wave S(t) periodically oscillating positively and negatively in time with respect to a center axis Dc. The first and second clock signals CK1 and CK2 also have a phase difference of approximately 180 degrees. The synchronous detection circuit 40 has first and second moving-average circuits 24a and 24b, each of which is composed of the time A/D converter as well as the moving-average circuit 24 according to the first embodiment. The first and second moving-average circuits 24a and 24b are referred to as "first and second TADs 24a and 24b" hereinafter.

The first TAD 24a is operative to average an input signal over each first period (moving-average period) Tp1 of the first clock signal CK1 corresponding to the half of the period Tc of the target carrier wave S(t) so as to generate a first moving average value DT1. Similarly, the second TAD 24b is operative to average the input signal over each second period (moving-average period) Tp2 of the second clock signal CK2 corresponding voltage levels (amplitudes) of the target carrier wave Wt with respect to the center axis Dc within the phase range between 0 degrees and 180 degrees. Similarly, the second area Sb is formed by the negative voltage levels (amplitudes) of the target carrier wave Wt with respect to the center axis Dc within the phase range between 180 degrees and 360 degrees.

In this case, the first digital data D1 corresponding to the first area Sa of the input voltage Vs over the phase range between 0 degrees and 180 degrees of the target carrier wave Wt is obtained as positive value (+) to be sent to the subtracting circuit 30. On the other hand, the digital data D2 corresponding to the second area Sb of the input voltage Vs over the phase range between 180 degrees and 360 degrees of the target carrier wave Wt is obtained as negative value (−) to be sent to the subtracting circuit 30.

The digital data Do1 corresponding to the difference value between the first positive moving-average value +D1 (positive first area +Sa) and the second negative moving-average value −D2 (negative second area −Sb), which is represented as "+D1−(−D2)=D1+D2", is calculated by the subtracting circuit 30. The digital data Do1 calculated as the value "D1+D2" corresponds to the sum of the positive and negative voltage levels (amplitudes) of the target carrier wave Wt, making it possible to synchronously detect the target carrier wave Wt with a high accuracy.

In other words, the digital data Do1 corresponding to the difference value between the positive first area +Sa and the negative second area −Sb, which is represented as "+Sa−(−Sb)=Sa+Sb", is calculated by the subtracting circuit 30. The digital data Do1 calculated as the value "Sa+Sb" corresponds to the total area of the target carrier to the half of the period Tc of the target carrier wave Wt2 so as to generate a second moving average value DT2.

The synchronous detection circuit 40 also has first, second, third, fourth, fifth, and sixth registers 26a, 26b, 28a, 28b, 32a, 32b, respectively.

The first and fourth registers 26a and 26b are operative to sequentially latch the first and second moving-average values DT1 and DT2 outputted from the first and second TAD 24a and 24b in synchronization with the first and second clock signals CK1 and CK2, respectively. The first and fourth registers 26a and 26b are operative to output previously latched first and second moving-average values DT1 and DT2, respectively. The second and fifth registers 28a and 28b are operative to sequentially latch the first and second moving-average values DT1 and DT2 outputted from the first and fourth registers 26a and 26b in synchronization with the first and second clock signals CK1 and CK2, respectively, so as to output previously latched first and second moving-average values DT1 and DT2, respectively.

The synchronous detection circuit 40 is provided with first and second subtracting circuits 30a and 30b. In FIG. 6, the first subtracting circuit 30a is illustrated as "first sub 30a", and the second subtracting circuit 30b is illustrated as "second sub 30b".

The first subtracting circuit 30a is operative to calculate a first difference value Do1 between the moving-average value currently latched in the first register 26a and the moving-average value currently latched in the second register 28a and previously latched in the first register 26a in synchronization with the first clock signal CK1. Similarly, the second subtracting circuit 30b is operative to calculate a second difference value Do2 value between the moving-average value currently latched in the fourth register 26b and the moving-average value currently latched in the fifth register 28b and previously latched in the fourth register 26b in synchronization with the second clock signal CK2.

The synchronous detection circuit 40 is provided with third and sixth registers 32a and 32b operative to sequentially latch the calculated first and second difference values Do1 and Do2, respectively.

The synchronous detection circuit 40 is provided with a processing circuit 34. The third and sixth registers 32a and 32b are operative to output the first and second latched difference values Do1 and Do2 to the processing circuit 34. The first subtracting circuit 30a and the third register 32a operate in synchronization with the first clock signal CK1 and the second subtracting circuit 30b and the sixth register 32b operate in synchronization with the second clock signal CK2.

The synchronous detection circuit 40 is provided with a frequency divider 21 operative to divide the frequency of the first clock signal CK1 by 2 to generate a third clock signal CK3 having a frequency that is the same as the frequency fc of the target carrier wave S(t). The processing circuit 34 operates in synchronization with the third clock signal CK3 to calculate an amplitude and a phase of the target carrier wave S(t), thereby outputting the calculated result as a detection result.

Next, overall operations of the synchronous detection device 1A will be explained hereinafter.

In the second embodiment, the input signal containing the target carrier wave S(t) is averaged by the first TAD 24a over each first period Tp1 half of the period Tc of the target carrier wave S(t). Similarly, the input signal containing the target carrier wave S(t) is averaged by the second TAD 24b over each second period Tp2 half of the period Tc of the target carrier wave S(t). The first period is referred to as "first moving-average period", and the second period is referred to as "second moving-average period". The first moving-average period Tp1 has a time difference with respect to the second moving-average period Tp2, which corresponds to the phase difference of 90 degrees.

It is assumed that the first difference value Do1 between the moving-average values that are adjacent to each other in time and that is obtained by the first TAD 24a is represented as "I", and the second difference value Do2 between the moving-average values that are adjacent to each other in time and that is obtained by the second TAD 24b is represented as "Q". Under this assumption, the target carrier wave S(t) is represented as the following equation:

$$S(t)=A \sin\{(2\pi f c)t+p\} \quad \text{[Equation 1]}$$

Where "A" indicates the amplitude of the target carrier wave S(t), "p" indicates the phase (phase difference) of the target carrier wave S(t) with respect to the first clock signal CK1, "t" indicates a time.

The equation 1 allows the I and Q to be represented as the following equations:

$$I = \int_0^{Tc/2} S(t)\,dt - \int_{Tc/2}^{Tc} S(t)\,dt = \frac{2A}{\pi f_c}\cos(p) \quad \text{[Equation 2]}$$

$$Q = \int_{-Tc/4}^{Tc/4} S(t)\,dt - \int_{Tc/4}^{3Tc/4} S(t)\,dt = \frac{2A}{\pi f_c}\sin(p) \quad \text{[Equation 3]}$$

When the reference character "j" expresses imaginary unit, the equations 2 and 3 permit the amplitude A and the phase p of the target carrier wave S(t) to be obtained in accordance with the following equation using the I and Q as parameters:

$$A = \frac{\pi f_c}{2}\sqrt{I^2 + Q^2} \quad \text{[Equation 4]}$$

$$p=\arg(I+jQ) \quad \text{[Equation 5]}$$

Where "arg(I+jQ)" represents the argument of the complex number "I+jQ".

That is, even if the phase p of the target carrier wave S(t) is unknown, the calculations based on the equations 4 and 5 allow the amplitude A and the phase p of the target carrier wave S(t) to be obtained.

Thus, in the second embodiment, the calculations based on the equations 4 and 5 are carried out by the processing circuit 34 to obtain the amplitude A and the phase p of the target carrier wave S(t).

The synchronous detection circuit 40 according to the second embodiment is adapted to obtain the amplitude A and the phase p of the target carrier wave without using a clock signal whose phase is equal to the phase of the target carrier wave, as explained in the first embodiment.

When desired signal components are phase-modulated and/or amplitude-modulated on the target carrier wave, the synchronous detection circuit 40 allows the signal components to be detected from the modulated target carrier wave.

Next, unwanted signal components that the synchronous detection circuit 40 can eliminate will be explained.

When the phase p of the target carrier wave S(t) is set to "0 degrees", in other wards, the phase p is equal to "0°", the I, Q, and the amplitude A are represented as "I=2A/(πfc)", "Q=0", and "A=πfcI/2".

When the phase p of the target carrier wave S(t) is set to "90 degrees", in other wards, the phase p is equal to "±90°", the I, Q, and the amplitude A are represented as "I=0", "Q=±2A/(πfc)", and "A=πfcQ/2".

In the first embodiment, the I is obtained assuming that the phase p of the target carrier wave is equal to zero. This result in the case where the phase p is equal to ±90 degrees, therefore, coincides with that, in the first embodiment, the carrier wave components (unwanted signal components) having the phase difference of 90 degrees with respect to the clock signal CK can be eliminated to obtain the amplitude of the target carrier wave in phase with the clock signal CK.

In signal components S(t) each having an arbitral frequency f and represented as "S(t)=A sin {(2πf)t+p}", when the value (f/fc) obtained by dividing the arbitral frequency f by the frequency fc of the target carrier wave is an integer, the I and Q are represented by the following equations:

$$I = \begin{cases} 0 & (f/fc = 0, 2, 4, \ldots) \\ \dfrac{2A}{\pi f}\cos p & (f/fc = 1, 3, 5, \ldots) \end{cases}$$ [Equation 6]

$$Q = \begin{cases} 0 & (f/fc = 0, 2, 4, \ldots) \\ +\dfrac{2A}{\pi f}\sin p & (f/fc = 1, 5, 9, \ldots) \\ -\dfrac{2A}{\pi f}\sin p & (f/fc = 3, 7, 11, \ldots) \end{cases}$$ [Equation 7]

That is, when the input signal whose frequency is an even multiple of the frequency fc of the target carrier wave is inputted to the synchronous detection circuit 40, the I and Q result in zero. These results are easily understood for one reason that each of the first and second moving average periods Tp1 and Tp2 of the input signal, which is half of the period Tc of the target carrier wave, represented as "Tc/2", is an integral multiple of the frequency f of the input signal. Another one reason is that integrating a sine wave over one period gives zero.

In contrast, when the value (f/fc) is not an integer, the I and Q result in values except for zero. Adding N pieces of the I continuously obtained every period Tc results in $I_N$, and adding N pieces of the Q continuously obtained every period Tc results in $Q_N$, which are represented as the following equations:

$$I_N = -\dfrac{A}{\pi f}\tan\left(\dfrac{\pi}{2}\dfrac{f}{f_c}\right)\sin\left(\pi N\dfrac{f}{f_c}\right)\cos\left(p+\pi N\dfrac{f}{f_c}\right)$$ [Equation 8]

$$Q_N = -\dfrac{A}{\pi f}\left(\dfrac{1}{\cos\left(\dfrac{\pi}{2}\dfrac{f}{f_c}\right)}-1\right)\sin\left(\pi N\dfrac{f}{f_c}\right)\sin\left(p+\pi N\dfrac{f}{f_c}\right)$$ [Equation 9]

Selecting a positive integer as the N so that the N·f/fc becomes a positive integer allows the $I_N$ and the $Q_N$ to be equal to zero, respectively. For example, when the f/fc is 1/2, selecting one of 2, 4, 6, ... as the N permits the N·f/fc to become a positive integer, and when the f/fc is 1/3, selecting one of 3, 6, 9, ... as the N permits the N·f/fc to become a positive integer. In addition, when the f/fc is 1/3.5, selecting one of 7, 14, 21, ... as the N permits the N·f/fc to become a positive integer. Setting the $I_N$ and the $Q_N$ to be equal to zero permits the signal components each having the frequency f to be canceled.

In addition, setting "12" as the N allows the signal components whose frequencies are 12's common submultiples of the frequency fc, such as fc/2, fc/3, fc/4, fc/6, and fc/12, to be canceled.

Figure 7:
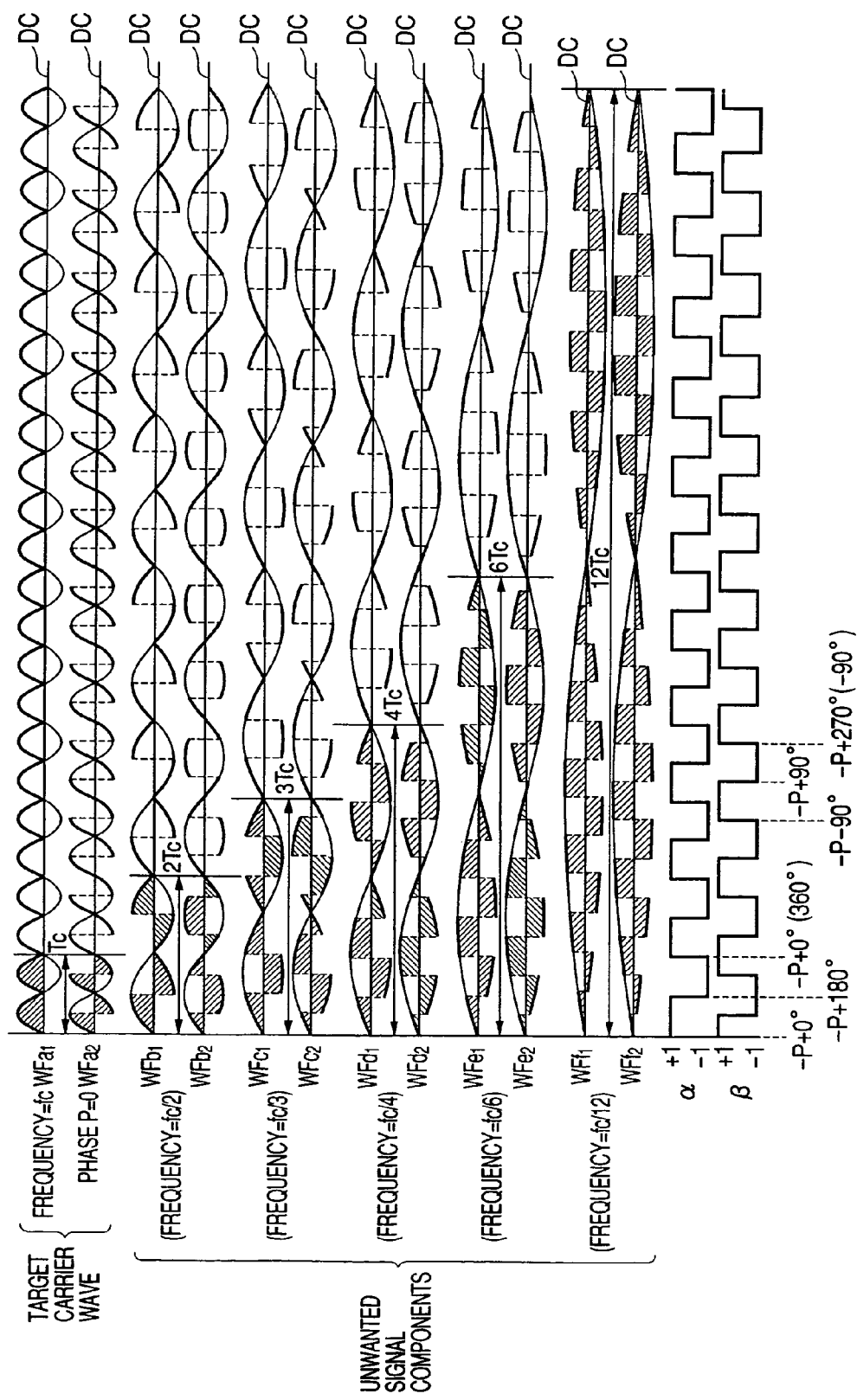
FIG. 7 is a waveform chart indicative of waveforms of signal components whose frequencies are 12's common submultiples of a frequency of a target carrier wave when a phase thereof is 0 according to the second embodiment of the invention.
Figure 8:
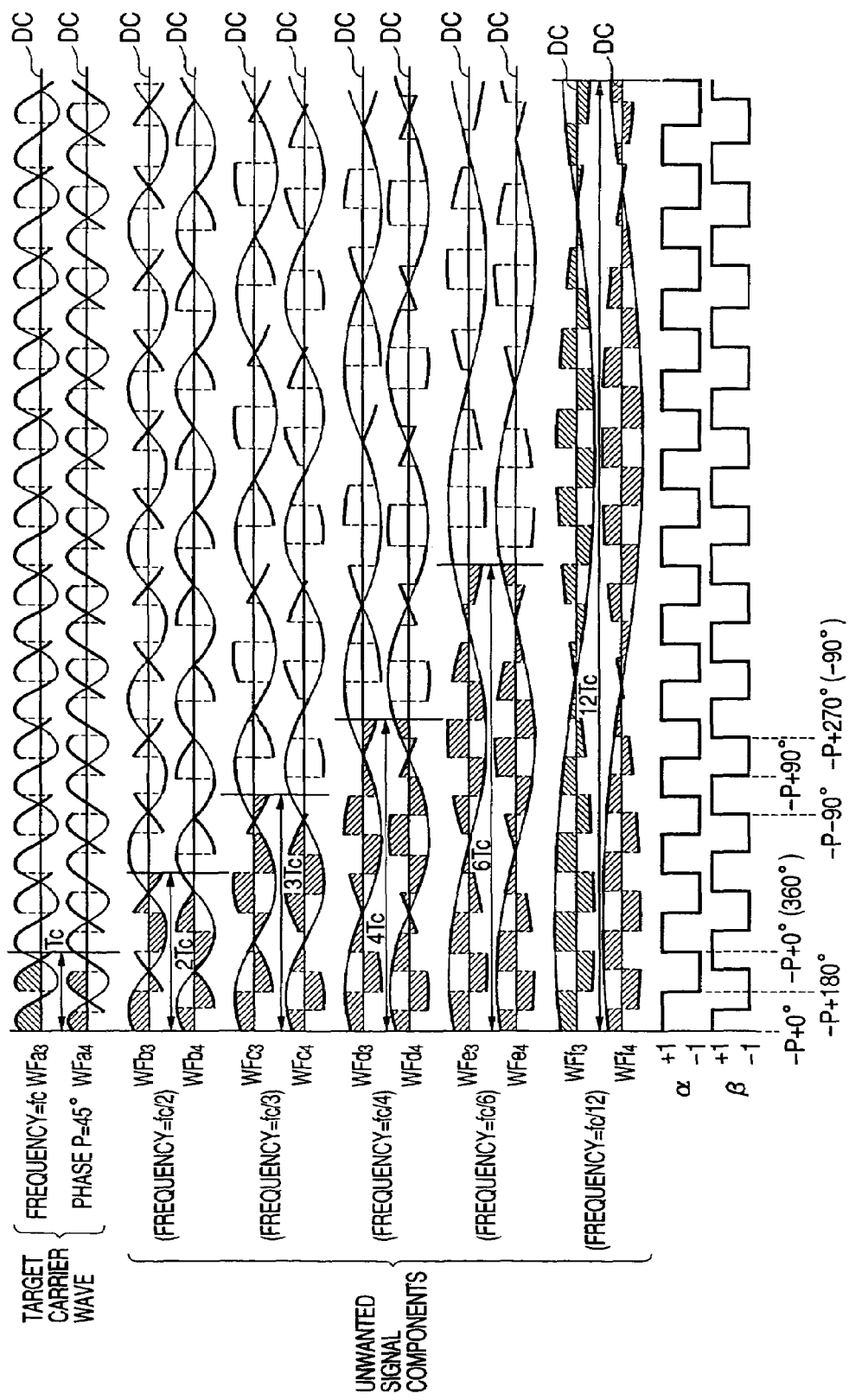
FIG. 8 is a waveform chart indicative of waveforms of signal components whose frequencies are 12's common submultiples of the frequency of the target carrier wave when the phase thereof is 45 degrees according to the second embodiment of the invention.

Examples of waveforms of these signal components whose frequencies are fc/2, fc/3, fc/4, fc/6, and fc/12 are illustrated in FIG. 7, FIG. 8, and FIG. 9, when the phases of the target carrier waves are 0 degrees, 45 degrees, and 90 degrees, respectively.

In FIGS. 7 to 9, the reference characters α and β represent the first and second moving-average periods Tp1 and Tp2 based on the first and second clock signals CK1 and CK 2, respectively. The reference characters α and β also indicate addition and subtraction periods, respectively.

For example, the periods in which the α is "+1", correspond to phase ranges of the target carrier wave between (p+0 degrees) and (p+180 degrees). The moving-average values DT1 outputted from the first TAD 24a in synchronization with the first clock signal CK1 during the periods in which the α is "+1" are added. In particular, the moving-average values DT1, after "+1" is multiplied to them, are added.

The periods in which the α is "−1", correspond to phase ranges of the target carrier wave between (p+180 degrees) and (p+360 degrees). The moving-average values DT1 outputted from the first TAD 24a in synchronization with the first clock signal CK1 during the periods in which the α is "−1" are subtracted. In particular, the moving-average values DT1, after "−1" is multiplied to them, are added.

Similarly, the periods in which the β is "+1", correspond to a phase range of the target carrier wave between (p−90 degrees) and (p+90 degrees). The moving-average values DT2 outputted from the second TAD 24b in synchronization with the second clock signal CK2 during the periods in which the β is "+1" are added. In particular, the moving-average values DT2, after "+1" is multiplied to them, are added.

The periods in which the β is "−1", correspond to a phase range of the target carrier wave between (p+90 degrees) and (p+270 degrees). The moving-average values DT2 outputted from the second TAD 24b in synchronization with the second clock signal CK2 during the periods in which the β is "−1" are subtracted. In particular, the moving-average values DT2, after "−1" is multiplied to them, are added.

In FIGS. 7 to 9, two waveforms of the target carrier wave with the frequency fc, and two waveforms of each of unwanted signal components having frequencies that are 12's common submultiples of the frequency fc, such as fc/2, fc/3, fc/4, fc/6, and fc/12, respectively, are illustrated from top to bottom of each figure.

That is, the waveforms WFa1 and WFa2 of the target carrier wave whose phase is equal to zero, the waveforms WFb1 and WFb2 of the unwanted signal component whose frequency of (fc/2), and the waveforms WFc1 and WFc2 of the unwanted signal component whose frequency of (fc/3) are illustrated in FIG. 7. The waveforms WFd1 and WFd2 of the unwanted signal component whose frequency of (fc/4), the waveforms WFe1 and WFe2 of the unwanted signal component whose frequency of (fc/6), and the waveforms WFf1 and WFf2 of the unwanted signal component whose frequency of (fc/12) are illustrated in FIG. 7.

Similarly, the waveforms WFa3 and WFa4 of the target carrier wave whose phase is equal to 45 degrees, the waveforms WFb3 and WFb4 of the unwanted signal component whose frequency of (fc/2), and the waveforms WFc3 and WFc4 of the unwanted signal component whose frequency of (fc/3) are illustrated in FIG. 8. The waveforms WFd3 and WFd4 of the unwanted signal component whose frequency of (fc/4), the waveforms WFe3 and WFe4 of the unwanted signal component whose frequency of (fc/6), and the waveforms WFf3 and WFf4 of the unwanted signal component whose frequency of (fc/12) are illustrated in FIG. 8.

The waveforms WFa5 and WFa6 of the target carrier wave whose phase is equal to 90 degrees, the waveforms WFb5 and WFb6 of the unwanted signal component whose frequency of (fc/2), and the waveforms WFc5 and WFc6 of the unwanted signal component whose frequency of (fc/3) are illustrated in FIG. 9. The waveforms WFd5 and WFd6 of the unwanted signal component whose frequency of (fc/4), the waveforms WFe5 and WFe6 of the unwanted signal component whose frequency of (fc/6), and the waveforms WFf5 and WFf6 of the unwanted signal component whose frequency of (fc/12) are illustrated in FIG. 9.

In FIGS. 7-9, each of the waveforms WFa1 to WFf1, WFa3 to WFf3, and. WFa5 to WFf5 represents the addition operations of the moving-average values DT1 in synchronization with the first clock signal CK1. Similarly, each of the waveforms WFa2 to WFf2, WFa4 to WFf4, and WFa6 to WFf6 represents the addition operations of the moving-average values DT2 in synchronization with the second clock signal CK2.

Figure 10A:
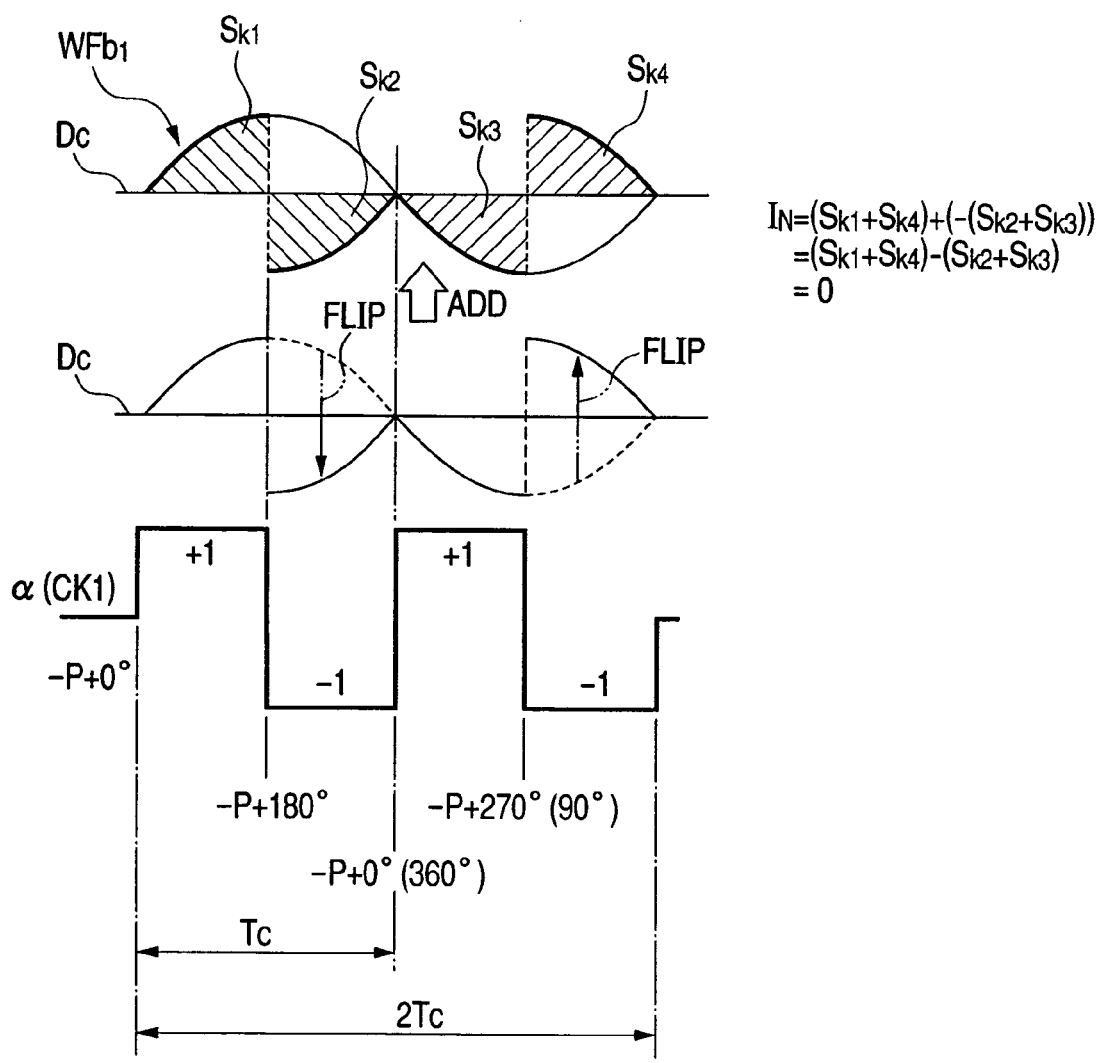
FIG. 10A is a waveform chart indicative of one of the waveforms of the signal components shown in FIG. 8 for explaining operations of the synchronous detection device according to the second embodiment of the invention.

For example, as shown in FIG. 10A, integrating the output values DI of the unwanted signal whose frequencies of (fc/2) within its period (2Tc), which corresponds to the equation "IN={(Sk1+Sk4)+(−(Sk2+Sk3))}", becomes nearly zero.

As shown in FIG. 10A, the moving-average value DT1 within the phase ranges of the target carrier wave between (p+180 degrees) and (p+360 degrees) are multiplied by the α of "−1". This results in that the parts of waveform of the moving-average value DT1 are flipped relative to the center axis Dc within the phase ranges of the target carrier wave between (p+180 degrees) and (p+360 degrees). As a result, the waveform representing the result of adding the moving-average values DT1 within the period of 2Tc is illustrated as "WFb1" by heavy lines.

That is, the positive areas Sk1 and SK4 formed between the positive portions of the waveform WFb1 and the center axis Dc, and the negative areas SK2 and the SK3 formed between negative portions of the waveform WFb1 and the center axis Dc correspond to the data I of the equation 6, which are outputted from the third register 32a as output data DI. These areas Sk1-Sk4 are hatched in FIG. 10A, respectively.

Figure 10B:
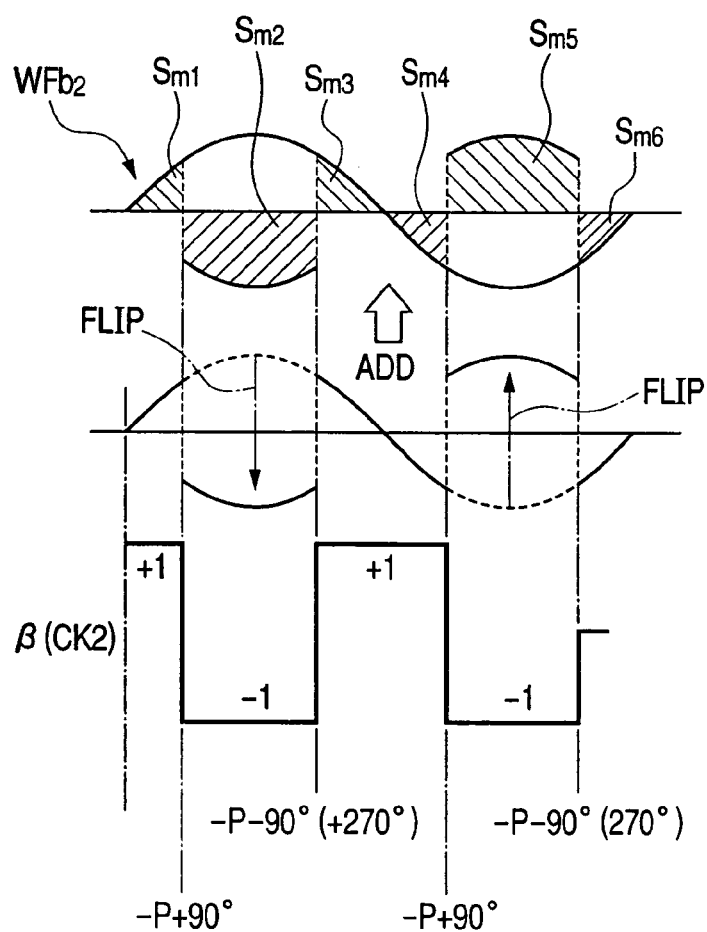
FIG. 10B is a waveform chart indicative of one of the waveforms of the signal components shown in FIG. 8 for explaining operations of the synchronous detection device according to the second embodiment of the invention.

Similarly, as shown in FIG. 10B, the moving-average value DT2 within the phase ranges of the target carrier wave between (p+90 degrees) and (p+270 degrees) are multiplied by the β of "−1". This results in that the parts of waveform of the moving-average value DT2 are flipped relative to the center axis Dc within the phase ranges of the target carrier wave between (p+90 degrees) and (p+270 degrees). As a result, the waveform representing the result of adding the moving-average values DT2 within the period of 2Tc is illustrated as "WFb2" by heavy lines.

That is, the positive areas Sm1, Sm3, and Sm5 formed between the positive portions of the waveform WFb2 and the center axis Dc, and the negative areas Sm2, Sm4, and Sm6 formed between negative portions of the waveform WFb2 and the center axis Dc correspond to data Q of the equation 7, which are outputted from the sixth register 32b as output data DQ. These areas Sm1-Sm6 are hatched in FIG. 10B, respectively.

Similarly, each waveform representing the result of adding the moving-average values DT1 within each of the periods (Tc), (2Tc), (3Tc), (4Tc), (6Tc), and (12Tc) of the unwanted signals, which correspond to the frequencies (fc), (fc/2), (fc/3), (fc/4), (fc/6), and (fc/12), respectively, is illustrated by heavy lines.

As described above, the positive areas formed between the positive portions of each waveform and the center axis Dc, at least partially hatched in FIGS. 7-9, indicate the I outputted from the third register 32a as the output data DI. The negative areas formed between the negative portions of each waveform and the center axis Dc, at least partially hatched in FIGS. 7-9, indicate the Q outputted from the sixth register 32b as the output data QI.

As visually illustrated in FIGS. 7-9, the output DI of the target carrier wave from the third register 32a takes on the maximum value when the phase p is equal to zero, on zero when the phase p is equal to 90 degrees, and on the intermediate value therebetween. The output DQ of the target carrier wave from the sixth register 32b takes on zero when the phase p is equal to zero, on the maximum value when the phase p is equal to 90 degrees, and on the intermediate value therebetween. The maximum value of the output DI of the target carrier wave from the third register 32a and that of the output DQ from the sixth register 32b are the same with each other. The moving-average values DI and the moving-average values of the target carrier wave when the phase p is equal to 45 degrees are the same with each other.

These results visually illustrated in FIGS. 7-9 coincide with the results obtained in accordance with the equations 6 and 7 when the "f/fc" is equal to 1.

Furthermore, integrating all of the output values DI of each of the unwanted signal whose frequencies of (fc/2), (fc/3), (fc/4), (fc/6), and (fc/12), within their respective periods (2Tc), (3Tc), (4Tc), (6Tc), and (12Tc), which corresponds to the IN of the equation 8, becomes nearly zero. These features are visually recognized from the symmetry of each waveform of each unwanted signal with respect to the center axis in FIGS. 7-9, especially in FIGS. 10A and 10B.

For example, as shown in FIG. 10A, integrating all of the output values DI of the unwanted signal whose frequency of (fc/2) within its period (2Tc), which corresponds to integrating all areas Sk1 to Sk4, the positive areas (Sk1+Sk4) are canceled by the negative areas (Sm1+Sm2) to become zero.

Similarly, as shown in FIG. 10B, integrating all of the output values DQ of the unwanted signal whose frequency of (fc/2) within its period (2Tc), which corresponds to integrating all areas Sm1 to Sm6, the positive areas (Sm1+Sm3+Sm5) are canceled by the negative areas (Sm2+Sm4+Sm6) to become zero.

Incidentally, areas of an unwanted signal with a frequency that is an odd submultiple of the frequency fc of the target carrier wave are not symmetrical with respect to the center axis, for example, the positive and negative areas of the waveform WFc1, so that it may be difficult to visually recognize the sum of the output values DI of such an unwanted signal.

In this case, however, it is possible to recognize the sum of the output values DI of such an unwanted signal in accordance with the equations 8 and 9.

In the second embodiment, unwanted signals whose frequencies are lower than the frequency fc of the target carrier wave are explained as examples in accordance with FIGS. 7-9. Adding the output values DI and DQ corresponding to each of unwanted signals whose frequencies are even multiple of the target carrier wave becomes zero (see the equations 6 and 7).

In the synchronous detection device 1A according to the second embodiment, in the same manner as the first embodiment, even if at least one of unwanted signals explained as (1) to (6) in the first embodiment is contained in the target carrier wave, it is possible to obtain the difference values between the difference values between the moving-average values of the input signal Vs. This feature enables the signal components of the target carrier wave to be extracted with high accuracy.

In the second embodiment, the amplitude A and the phase p of the target carrier wave are calculated by the processing circuit 34, but the present invention is not limited to the structure. The results of the data DI and DQ obtained by the first and second subtracting circuits 30a and 30b may be outputted as two vector components of the I and Q. In this modification, the frequency divider 21 and the processing circuit 34 may be omitted from the synchronous detection circuit 40, making it possible to reduce further the synchronous detection device in size and in cost.

Third Embodiment

A third embodiment of the present invention will be described hereinafter. Incidentally, elements in the third embodiment, which are substantially identical with those in the second embodiment, are assigned to the same characters as the second embodiment so that detail explanations thereabout are omitted.

Figure 11:
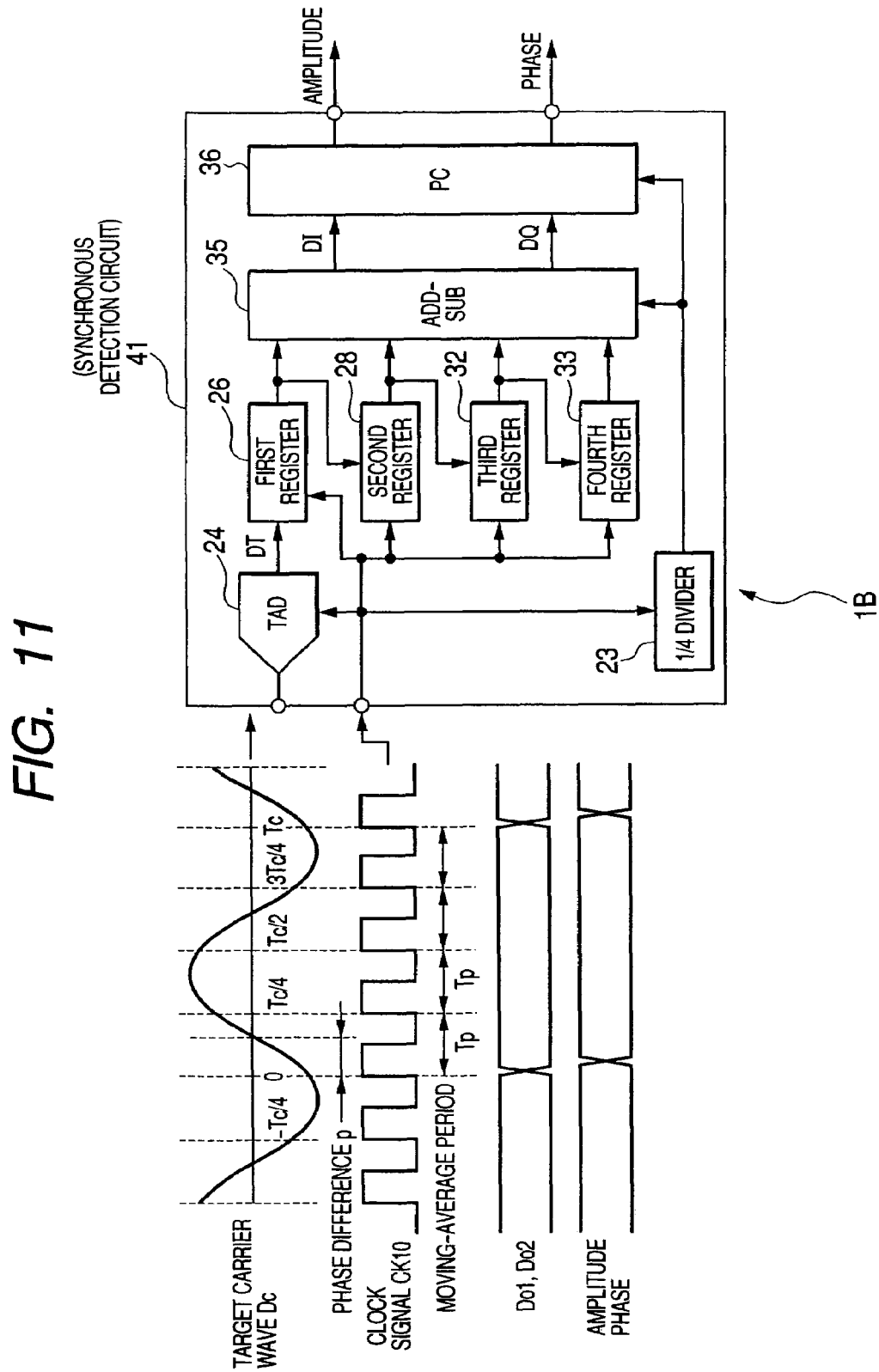
FIG. 11 is a block diagram for explaining a structure of a synchronous detection device and input signals with respect to the synchronous detection device according to a third embodiment of the invention.

As shown in FIG. 11, a synchronous detection device 1B according to a third embodiment is provided with a synchronous detection circuit 41 that operates in response to a clock signal CK10 which has a frequency (4×fc) quadruple of a frequency fc of a target carrier wave S(t). The target carrier wave S(t) is a periodic wave S(t) periodically oscillating positively and negatively in time with respect to a center axis Dc. The synchronous detection circuit 41 has a moving-average circuit 24, which is composed of the time A/D converter as well as the moving-average circuit 24 according to the first embodiment.

The TAD 24 is operative to average an input signal over each period (moving-average period) Tp of the clock signal CK10 corresponding to the quarter of the period Tc of the target carrier wave S(t) so as to generate a moving average value DT. That is, the moving-average period Tp is equal to (Tc/4).

The synchronous detection circuit 41 also has first, second, third, and fourth registers 26, 28, 32, 33, respectively.

The first, second, third, and fourth registers 26, 28, 32, and 33 are operative to sequentially latch the moving-average value DT outputted from the TAD 24 in synchronization with the clock signal CK10, respectively.

The synchronous detection circuit 41 is provided with a frequency divider 23 operative to divide the frequency of the clock signal CK10 by 4 to generate a clock signal CK 11 having a frequency that is the same as the frequency fc of the target carrier wave S(t).

The synchronous detection circuit 41 is provided with an adder-subtractor 35. In FIG. 11, the adder-subtractor 35 is illustrated as "add-sub 35".

The adder-subtractor 35 operates, in synchronization with the clock signal CK10, to capture the four moving-average values S1 to S4 sequentially latched by the first to fourth registers 26, 28, 32, and 33 and to perform adding and subtracting operations of the four captured moving average values S1 to S4.

The synchronous detection circuit 41 is provided with a processing circuit (PC) 36. The processing circuit 36 operates in synchronization with the clock signal CK10 to calculate an amplitude and a phase of the target carrier wave S(t) based on data DI and data DQ outputted from the adder-subtractor 35.

The adder-subtractor 35 performs adding and subtracting operations of the four sequential moving average values S1 to S4 in accordance with the following equations to obtain I and Q, and outputs the obtained I and Q to the processing circuit 36 as the data DI and DQ.

$$I = S_1 + S_2 - S_3 - S_4 = + \int_0^{Tc/4} S(t)dt + \int_{Tc/4}^{Tc/2} S(t)dt - \int_{Tc/2}^{3Tc/4} S(t)dt - \int_{3Tc/4}^{Tc} S(t)dt$$
$$= + \int_0^{Tc/2} S(t)dt - \int_{Tc/2}^{Tc} S(t)dt$$ [Equation 10]

$$Q = S_1 - S_2 - S_3 + S_4 = + \int_0^{Tc/4} S(t)dt - \int_{Tc/4}^{Tc/2} S(t)dt - \int_{Tc/2}^{3Tc/4} S(t)dt + \int_{3Tc/4}^{Tc} S(t)dt$$
$$= + \int_0^{Tc/4} S(t)dt - \int_{Tc/4}^{3Tc/4} S(t)dt + \int_{3Tc/4}^{Tc} S(t)dt$$ [Equation 11]

That is, the synchronous detection device 1B in the third embodiment, even if the phase p of the target carrier wave S(t) is unknown, realizes the functions that allow the amplitude A and the phase p of the target carrier wave S(t) to be obtained from the input signal by single moving-average circuit 24 without using the first and second TADs 24a and 24b.

In the third embodiment, the input signal is repeatedly averaged by the moving-average circuit 24 over each period (Tc/4) that is a quarter of the period Tc of the target carrier wave. The data I and Q are obtained in accordance with the equations 10 and 11 based on the four sequential moving-average values obtained by the moving-average circuit 24. The obtained data I and Q are outputted as the data DI and DQ to the processing circuit 36, so that the amplitude A and the phase p of the target carrier wave are obtained by the processing circuit 36 in the same manner as the second embodiment.

The third embodiment, therefore, allows the structure of the synchronous detection device 41 that can obtain the same effects as the second embodiment to be simplified.

In addition, in the third embodiment, the moving-average periods of the moving-average values S1-S4 used for obtaining the I and the Q in the adder-subtractor 35 completely coincide with each other as the moving-average period of Tp. The moving-average values S1-S4, therefore, have no differences in period from each other, which prevents detection errors from occurring due to the differences in period among the moving-average values S1-S4. This advantage makes it possible to improve the detection accuracy of the target carrier wave.

In the third embodiment, as well as the second embodiment, the results of the data DI and DQ obtained by the adder-subtractor 34 may be outputted as two vector components of the I and Q. In this modification, the processing circuit 36 may be omitted from the synchronous detection circuit 41, making it possible to reduce further the synchronous detection device in size and in cost.

Fourth Embodiment

A fourth embodiment of the present invention will be described hereinafter. Incidentally, elements in the fourth embodiment, which are substantially identical with those in the second embodiment or third embodiment, are assigned to the same characters as the second embodiment or the third embodiment so that detail explanations thereabout are omitted.

A synchronous detection device 1C in a fourth embodiment realizes the same functions as the synchronous detection circuit 40 or the synchronous detection circuit 41, and allows synchronous detection operations of an input signal to speed up.

That is, each of the synchronous detection circuits 40 and 41 obtains the detection result at each period Tc of the target carrier wave.

In contrast, a synchronous detection circuit 42 of the fourth embodiment updates the detection result of the target carrier wave four times per each period Tc.

Figure 12:
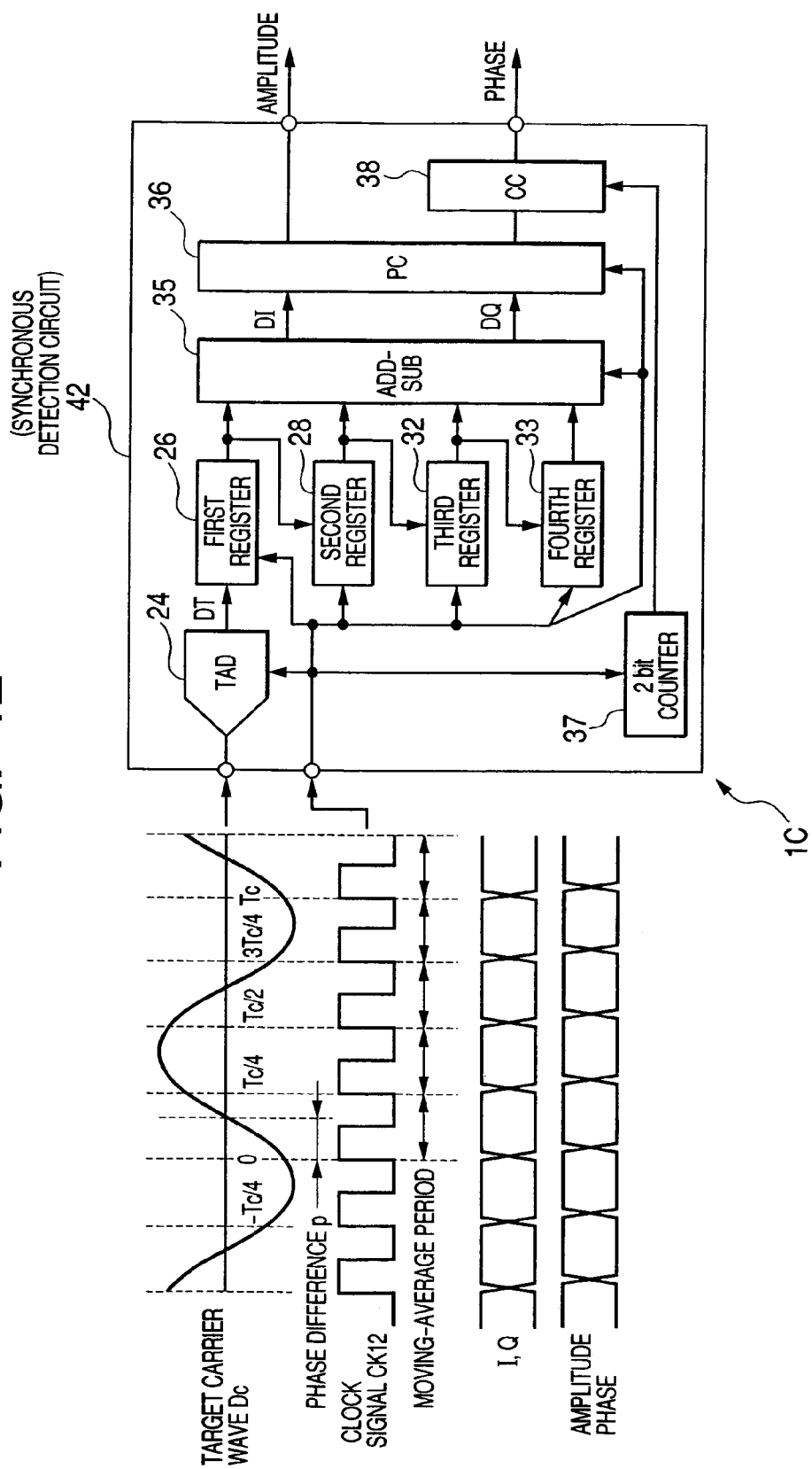
FIG. 12 is a block diagram for explaining a structure of a synchronous detection device and input signals with respect to the synchronous detection device according to a fourth embodiment of the invention.

For realizing this function, the synchronous detection circuit 42 according to the fourth embodiment, as shown in FIG. 12, is designed so that a part of the synchronous detection circuit 41 shown in FIG. 11 is modified as the following manners.

In the synchronous detection circuit 42, one different point from the structure of the synchronous detection circuit 41 is that the adder-subtractor 35 and the processing circuit PC operates in synchronization with a clock signal 12 with a period (Tc/4) that is a quarter of the period Tc of the target carrier wave. Another one different point from the structure of the synchronous detection circuit 41 is that the synchronous detection circuit 42 has a 2-bit counter 37 and a phase correcting circuit 38 in place of the divider 21 or 23. The 2-bit counter 37 and the phase correcting circuit (CC) 38 are configured to correct the phase obtained during the 4-times operations of the processing circuit 36 per each period Tc. That is, the 2-bit counter 37 is operative to count up the number of clock pulses of the clock signal CK12. The phase correcting circuit 38 is operative to correct the phase p of the target carrier wave based on the count value (2-bits), which indicates operation cycles of the processing circuit 37 per each period Tc, counted by the 2-bit counter 37.

In the fourth embodiment, $I_k$ and $Q_k$ that are repeatedly calculated by the adder-subtractor 35 are represented as the following equations:

$$I_k = S_k + S_{k+1} - S_{k+2} - S_{k+3} \quad \text{[Equation 12]}$$
$$= +\int_{(k-1)Tc/4}^{kTc/4} S(t)\,dt + \int_{kTc/4}^{(k+1)Tc/4} S(t)\,dt -$$
$$\int_{(k+1)Tc/4}^{(k+2)Tc/4} S(t)\,dt - \int_{(k+2)Tc/4}^{(k+3)Tc/4} S(t)\,dt$$
$$= \frac{2A}{\pi}\cos\{p - \pi(k-1)/2\}$$

$$Q_k = S_k - S_{k+1} - S_{k+2} + S_{k+3} \quad \text{[Equation 13]}$$
$$= +\int_{(k-1)Tc/4}^{kTc/4} S(t)\,dt - \int_{kTc/4}^{(k+1)Tc/4} S(t)\,dt -$$
$$\int_{(k+1)Tc/4}^{(k+2)Tc/4} S(t)\,dt + \int_{(k+2)Tc/4}^{(k+3)Tc/4} S(t)\,dt$$
$$= \frac{2A}{\pi}\sin\{p - \pi(k-1)/2\}$$

where k is equal to 1, 2, ..., n (positive integer), the period of kTc/4 corresponds to a phase of (k·90 degrees).

The amplitude A and the phase p obtained by the processing circuit 36 and the phase p are represented as the following equations using the $I_k$ and the $Q_k$ as parameters:

$$A_k = \frac{\pi}{2}\sqrt{I_k^2 + Q_k^2} \quad \text{[Equation 14]}$$

$$p_k = \arg(I_k + jQ_k) + (k-1)\frac{\pi}{2} \quad \text{[Equation 15]}$$

That is, the equation for calculating the amplitude $A_k$ according to the fourth embodiment is the same as those of the second and third embodiments. In contrast, the phase $P_k$ has a correcting term of "(k−1)·π/2 [rad]", which corresponds to "(k−1)"·90·(k) degrees, so that the phase correcting circuit CC 38 operates to generate the correcting term. The correcting CC takes any value of 0 [rad], π/4[rad], π/2[rad], and 3π/4[rad], and the value taken by the correcting term is determined according to the count value (2-bit) of the counter 37.

Other structures and operations of the fourth embodiment are substantially identical with those of the second embodiment or the third embodiment. In this fourth embodiment, it is possible to speed up the synchronous detection operations of the input signal.

Fifth Embodiment

A fifth embodiment of the present invention will be described hereinafter.

In the second to fourth embodiments, the input signal is averaged over each period that is a half or a quarter of the period Tc of the target carrier wave in synchronization with the clock signal whose frequency is double or quadruple of the frequency fc thereof so that the moving-average values are time-sequentially obtained. The amplitude and the phase of the target carrier wave are calculated by adding and/or subtracting operations of the time-sequentially obtained moving-average values.

As described above, in the above structures, adding and/or subtracting the time-sequentially obtained moving-average values over each period Tc or each period that is an integral multiple of the period Tc allows the values I and Q to be obtained.

The values I and Q permit the unwanted signal components each having a frequency that is an even multiple of the frequency fc of the target carrier wave to be completely eliminated.

In addition, the IN is the sum of the values I each obtained by the adding and/or subtracting operations of the time-sequentially obtained moving-average values over each period Tc. The $Q_N$ is the sum of the values I each obtained by the adding and/or subtracting operations of the time-sequentially obtained moving-average values over each period Tc. The $I_N$ and $Q_N$ allow the unwanted signal components each having a frequency that is a non-integral multiple of frequency fc of the target carrier wave to be completely eliminated.

Combining, therefore, the inventions according to the second to fourth embodiments permits an amplitude A and a phase p of a specified target wave to be extracted from an input signal in which a plurality of carrier waves are multiplexed.

A fifth embodiment of the present invention, which is made under the background set forth above, will be described hereinafter. Incidentally, elements in the fifth embodiment, which are substantially identical with those in at least one of the second to fourth embodiments, are assigned to the same characters as at least one of the second to fourth embodiments so that detail explanations thereabout are omitted.

A synchronous detection device 1D according to the fifth embodiment is operative to extract a specified target carrier wave from an input signal in which a plurality of carrier waves including the target carrier wave are multiplexed so as to detect an amplitude of the target carrier wave and a phase thereof.

In the fifth embodiment, (N+1) types of sine waves C0, C1, C2, ..., CN, which have frequencies of fc0, fc1 equal to the "fc0/2", fc2 equal to the "fc0/4", fc3 equal to the "fc0/8", ...

, fcN equal to the "fc0/$2^N$", are prepared. The sine waves have phases of Tc0 equal to the "1/fc0", Tc1 equal to the "2Tc0", Tc2 equal to the "4Tc0", Tc3 equal to the "8Tc0", ..., TcN equal to the "$2^N$·Tc0", respectively. An arbitrary number of the sine waves including either the sine wave C0 having the highest frequency or the sine wave CN having the lowest frequency are selected as a plurality of carrier waves. The selected carrier waves are individually modulated in amplitude and/or phase to carry a signal. The modulated waves are multiplexed so that an input signal (multiplex signal) is generated. In this fifth embodiment, the N is set to "3".

When selecting any two of the frequencies of the plurality of carrier waves, one of the frequencies is an even multiple of the other thereof, and the highest period TcN is an integral (even) multiple of any one of the frequencies of the carrier waves except for the highest frequency.

Figure 13:
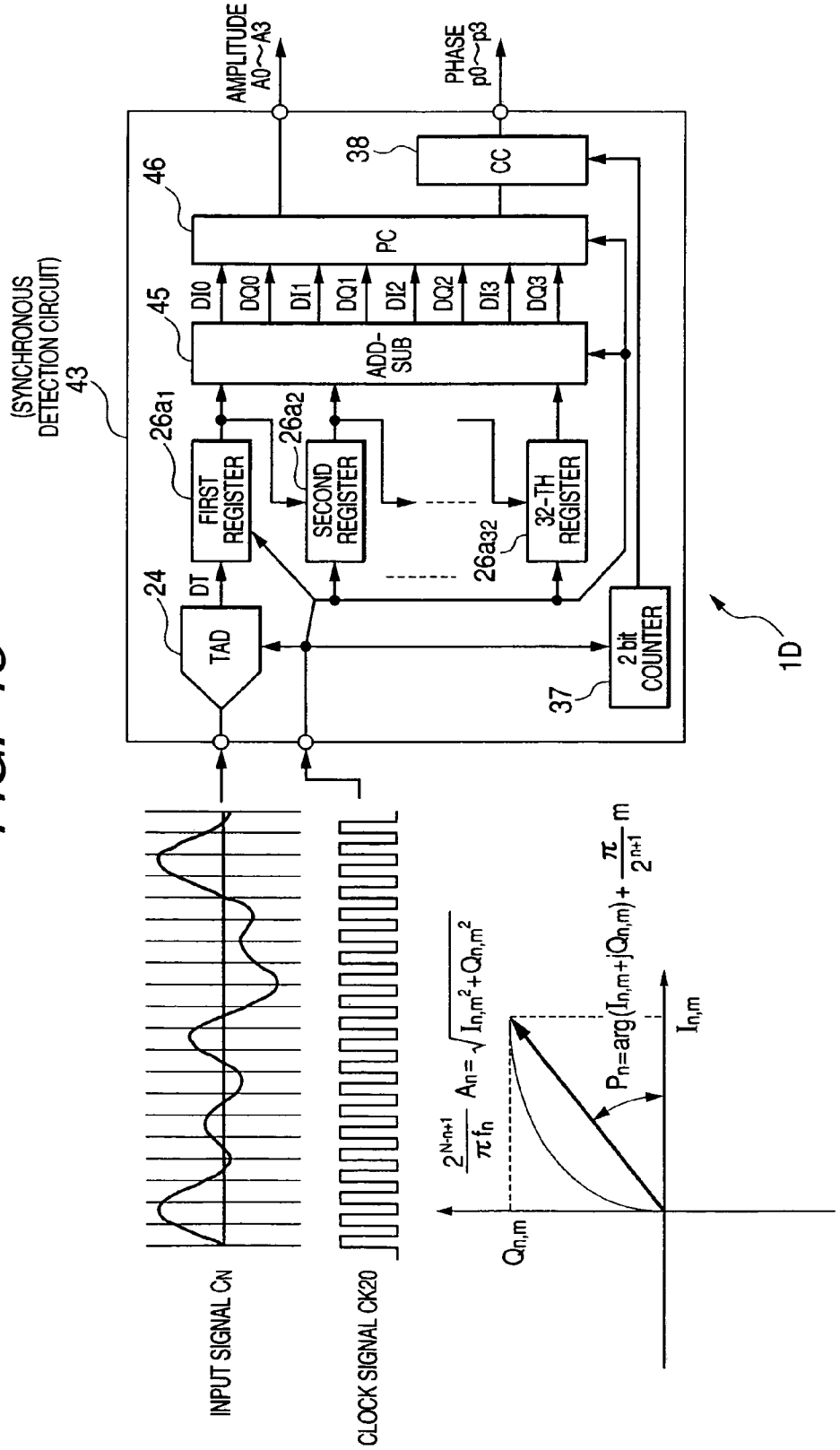
FIG. 13 is a block diagram for explaining a structure of a synchronous detection device and input signals with respect to the synchronous detection device according to a fifth embodiment of the invention.

As shown in FIG. 13, a synchronous detection device 1D according to the fifth embodiment is provided with a synchronous detection circuit 43 that operates in response to a clock signal CK20 which has a period Ts that is a quarter of the period Tc0 of the carrier wave C0 having the highest frequency.

The synchronous detection circuit 43 has a moving-average circuit 24, which is composed of the time A/D converter as well as the moving-average circuit 24 according to the first embodiment.

The TAD 24 is operative to average an input signal over each period (moving-average period) Tp of the clock signal CK20 so as to generate a moving average value.

The synchronous detection circuit 43 also has a first to a $2^{N+2}$-th registers 26a1 to 26a$2^{N+2}$, respectively. When the N is set to "3", the $2^{N+2}$-th register 26a$2^{N+2}$ is the 32-th register 26a32.

The first to the 32-th registers 26a1 to 26a32 are operative to sequentially latch the moving-average value outputted from the TAD 24 in synchronization with the clock signal CK20, respectively.

The synchronous detection circuit 43 is provided with the 2-bit counter 37 operative to count up the number of clock pulses of the clock signal CK20. The synchronous detection circuit 43 has the phase correcting circuit 38 operative to correct the phase p of the target carrier wave based on the count value (2-bits). The synchronous detection circuit 43 is provided with an adder-subtractor 45.

The adder-subtractor 45 operates, in synchronization with the clock signal CK20, to capture the moving-average values S1, S2, ..., S32 sequentially latched by the first to the 32-th registers 26a1, ..., 26a32 and to perform adding and subtracting operations of the first to the 32-th moving average values S1 to S32.

The synchronous detection circuit 43 is provided with a processing circuit (PC) 46. The processing circuit 46 operates in synchronization with the clock signal CK20 to calculate amplitudes A0 to A3 and phases p0 to p3 of the carrier waves constituting the input signal according to values DI0, DQ0, DI1, DQ1, DI2, DQ2, DI3, and DQ3 outputted from the adder-subtractor 45.

In the synchronous detection circuit 43, operation of the TAD 24 causes the moving-average values S1, S2, ..., which are represented as the following equation, to be outputted within each period (moving average period) of Ts that is a quarter of the period Tc0 of the carrier wave C0 having the highest frequency. That is, the moving average period Ts corresponds to a phase range between the sum of a phase p of the carrier wave C0 and (k·90) degrees, represented as (p+90·k) degrees, and that of the phase p of the carrier wave C0 and (k+1)·90 degrees, represented as {p+(k+1)·90} degrees. The "k" is equal to 0, 1, 2, ..., $2^{N+2}-1$.

Time-sequential first to 32-th moving average values, which are outputted at each phase range set forth above, are latched in the first to the 32-th registers 26a1 to 26a32, respectively.

$$S_j = \int_{(j-1)Ts}^{jTs} S(t)dt, \; j = 1, 2, 3, ... \quad \text{[Equation 16]}$$

In the fifth embodiment, because the N is set to 3, the adder-subtractor 45 performs adding and subtracting operations of the first to the 32-th time-sequential moving-average values S1 to $S2^{N+2}(=32)$, which covers one period of the carrier wave CN (=C3), in accordance with the following equations to obtain I0, Q0, I1, Q1, I2, Q2, I3, and Q3 of the carrier waves C0, C1, C2, and C3.

$$I_{n,m} = \sum_{i=1}^{2^{N-n}} \left\{ \sum_{k=2^n(4i-4)+1}^{2^n(4i-3)} S_{k+m} + \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\} \quad \text{[Equation 17]}$$

$$Q_{n,m} = \sum_{i=1}^{2^{N-n}} \left\{ \sum_{k=2^n(4i-4)+1}^{2^n(4i-3)} S_{k+m} - \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\} \quad \text{[Equation 18]}$$

The adder-subtractor 45 outputs the obtained I0, Q0, I1, Q1, I2, Q2, I3, and Q3 to the processing circuit 46 as the data DI0, DQ0, DI1, DQ1, DI2, DQ2, DI3, and DQ3.

Where n (n=0, 1, 2, ..., N) represents the selected carrier wave, and m (m=0, 1, 2, ..., N) represents a time-sequential number of each of the In and Qn that are averaged over each moving-average period Ts.

In the fifth embodiment, the N is set to 3 so that the input signal is a multiple signal in which the four carrier waves C0 to C3 that are modulated in amplitude and/or phase to carry individually signals are multiplexed. When the m is equal to zero, the I and Q calculated by the adder-subtractor 45 are represented as follows.

$I_{0,0}=[+S1+S2-S3-S4]+[+S5+S6-S7-S8]+[+S9+S10-S11-S12]+[+S13+S14-S15-S16]+[+S17+S18·S19-S20]+[+S21+S22-S23-S24]+[+S25+S26-S27-S28]+[+S29+S30-S31-S32]$ $Q_{0,0}=[+S1-S2-S3+S4]+[+S5-S6-S7+S8]+[+S9-S10-S11+S12]+[+S13-S14-S15+S16]+[+S17-S18-S19+S20]+[+S21-S22-S23+S24]+[+S25-S26-S27+S28]+[+S29-S30-S31+S32]$ $I_{1,0}=[+(S1+S2)+(S3+S4)-(S5+S6)-(S7+S8)]+[+(S9+S10)+(S11+S12)-(S13+S14)-(S15+S16)]+[+(S17+S18)+[S19+S20)-(S21+S22)-(S23+S24)]+[+(S25+S26)-(S27+S28)]-(+(S29+S30)+(S31+S32)]$ $Q_{1,0}=[+(S1+S2)-(S3+S4)-(S5+S6)+(S7+S8)]+[+(S9+S10)-(S11+S12)-(S13+S14)+(S15+S16)]+[+(S17+S18)-(S19+S20)-(S21+S22)+(S23+S24)]+[+(S25+S26)-(S27+S28)]-(+(S29+S30)+(S31+S32)]$ $I_{2,0}=[+(S1+S2+S3+S4)+(S5+S6+S7+S8)-(S9+S10+S11+S12)-(S13+S14+S15+S16)]+[+(S17+S18+S19+S20)+(S21+S22+S23+S24)-(S25+S26+S27+S28)-(S29+S30+S31+S32)]$ $Q_{2,0}=[+(S1+S2+S3+S4)-(S5+S6+S7+S8)-(S9+S10+S11+S12)+(S13+S14+S15+S16)]+[+(S17+S18+S19+S20)-(S21+S22+S23+S24)-(S25+S26+S27+S28)+(S29+S30+S31+S32)]$ $I_{3,0}=+(S1+S2+S3+S4+S5+S6+S7+S8)+(S9+S10+S11+S12+S13+S14+S15+S16)-(S17+S18+S19+S20+S21+S22+S23+S24)-(S25+S26+S27+S28+S29+S30+S31+S32)$ $Q_{3,0}+(S1+S2+S3+S4+S5+S6+S7+S8)-(S9+S10+S11+S12+S13+S14+S15+S16)-(S17+S18+S19+S20+S21+S22+S23+S24)+(S25+S26+S27+S28+S29+S30+S31+S32)$

The $I_{n,m}$ and the $Q_{n,m}$ of each carrier wave are represented as the following equations only when the frequency f of each carrier wave is equal to fcn:

$$I_{n,m} = \frac{2^{N-n+1}A_n}{\pi f_{cn}}\cos\left(p_n - \frac{\pi}{2^{n+1}}m\right) \quad \text{[Equation 20]}$$

$$Q_{n,m} = \frac{2^{N-n+1}A_n}{\pi f_{cn}}\sin\left(p_n - \frac{\pi}{2^{n+1}}m\right) \quad \text{[Equation 21]}$$

When the $I_{n,m}$ and the $Q_{n,m}$ of a carrier wave whose frequency f is not equal to fcn, the $I_{n,m}$ and the $Q_{n,m}$ are zero.

When a carrier wave whose frequency f is equal to the frequency of fn, the amplitude A and the phase p of the carrier wave are represented as the following equations:

$$A_n = \frac{\pi f_{cn}}{2^{N-n+1}}\sqrt{I_{n,m}^2 + Q_{n,m}^2} \quad \text{[Equation 21]}$$

$$p_n = \arg(I_{n,m} + jQ_{n,m}) + \frac{\pi}{2^{n+1}}m \quad \text{[Equation 22]}$$

The $I_{n,m}$ and the $Q_{n,m}$ are illustrated on a complex plane in FIG. 12 as detection outputs, respectively.

That is, the $I_{n,m}$ and the $Q_{n,m}$ provide the amplitude Cn and the phase pn of the carrier wave Cn whose frequency f equal to the frequency fn, so that information related to other carrier waves are not included in the $I_{n,m}$ and the $Q_{n,m}$.

Figure 14:
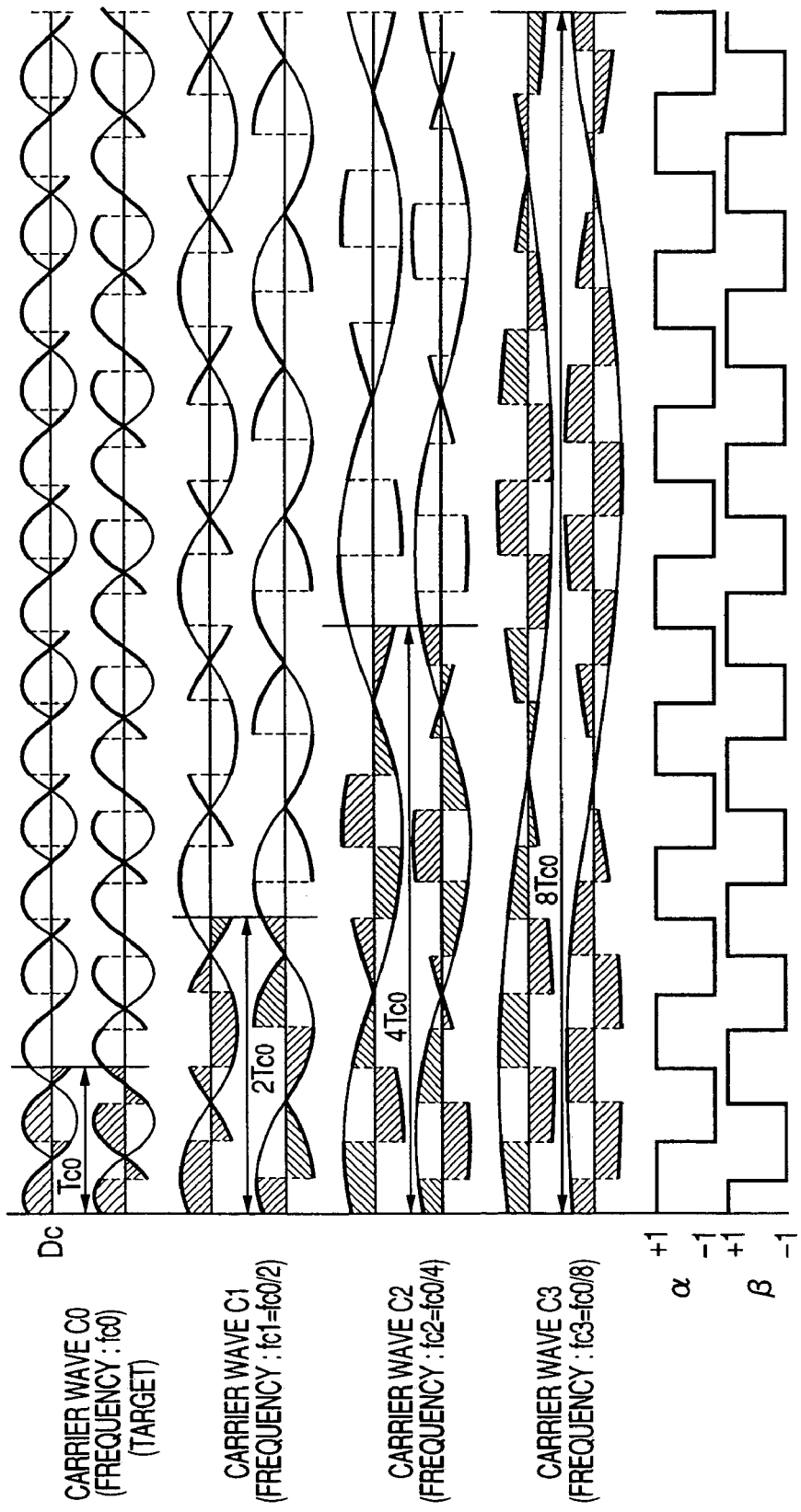
FIG. 14 is a waveform chart indicative of waveforms of carrier waves including a target carrier wave whose frequency is fc0 when a phase thereof is 45 degrees according to the fifth embodiment of the invention.

For example, FIG. 14 represents a waveform of the carrier wave C0, which is the target of synchronous detection, and other waveforms of other carrier waves C1, C2, and C3 when the phase of each carrier wave C0 to C3 is set to, for example, 45 degrees. The frequencies of the carrier waves C0, C1, C2, and C3 are set to fc0, fc1, fc2, and fc3, respectively.

As shown in FIG. 14 and FIG. 8 set forth above, integrating the moving average values S1 to S 32 of the carrier waves C1, C2, and C3 except for the target carrier wave C0 within their respective periods (2Tc0), (4Tc0), and (8Tc0) becomes nearly zero. These features are visually recognized from the symmetry of each waveform of each of the carrier waves C1, C2, and C3 with respect to the center axis Dc (see hatching areas of the carrier waves C1, C2, and C3). This feature allows the target carrier wave C0 whose frequency fcn=fc0 to be detected, making it possible to obtain the amplitude An (n=0) and the phase pn (n=0) of the target carrier wave C0.

Figure 15:
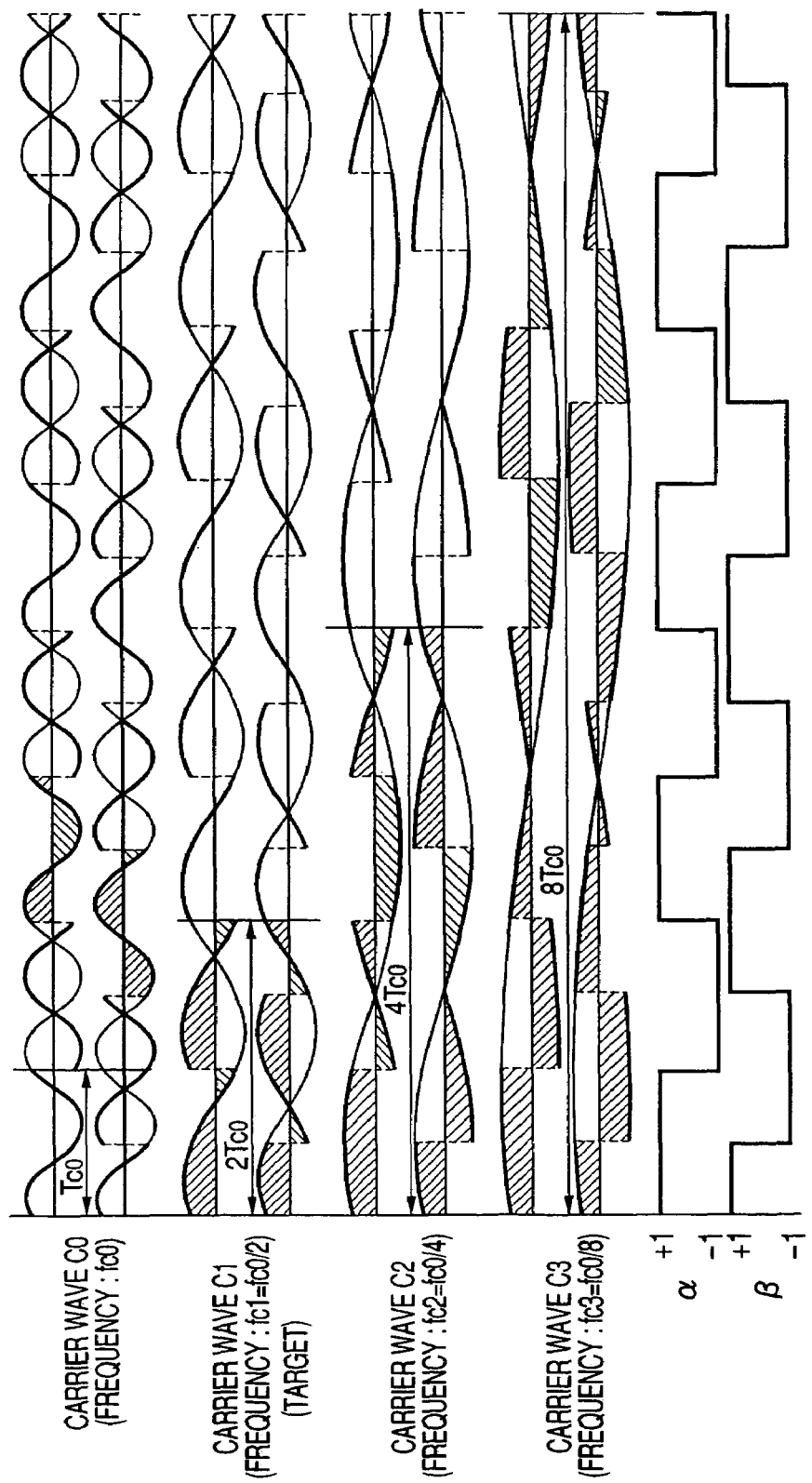
FIG. 15 is a waveform chart indicative of waveforms of the carrier waves including a target carrier wave whose frequency is fc1 when the phase thereof is 45 degrees according to the fifth embodiment of the invention.
Figure 16:
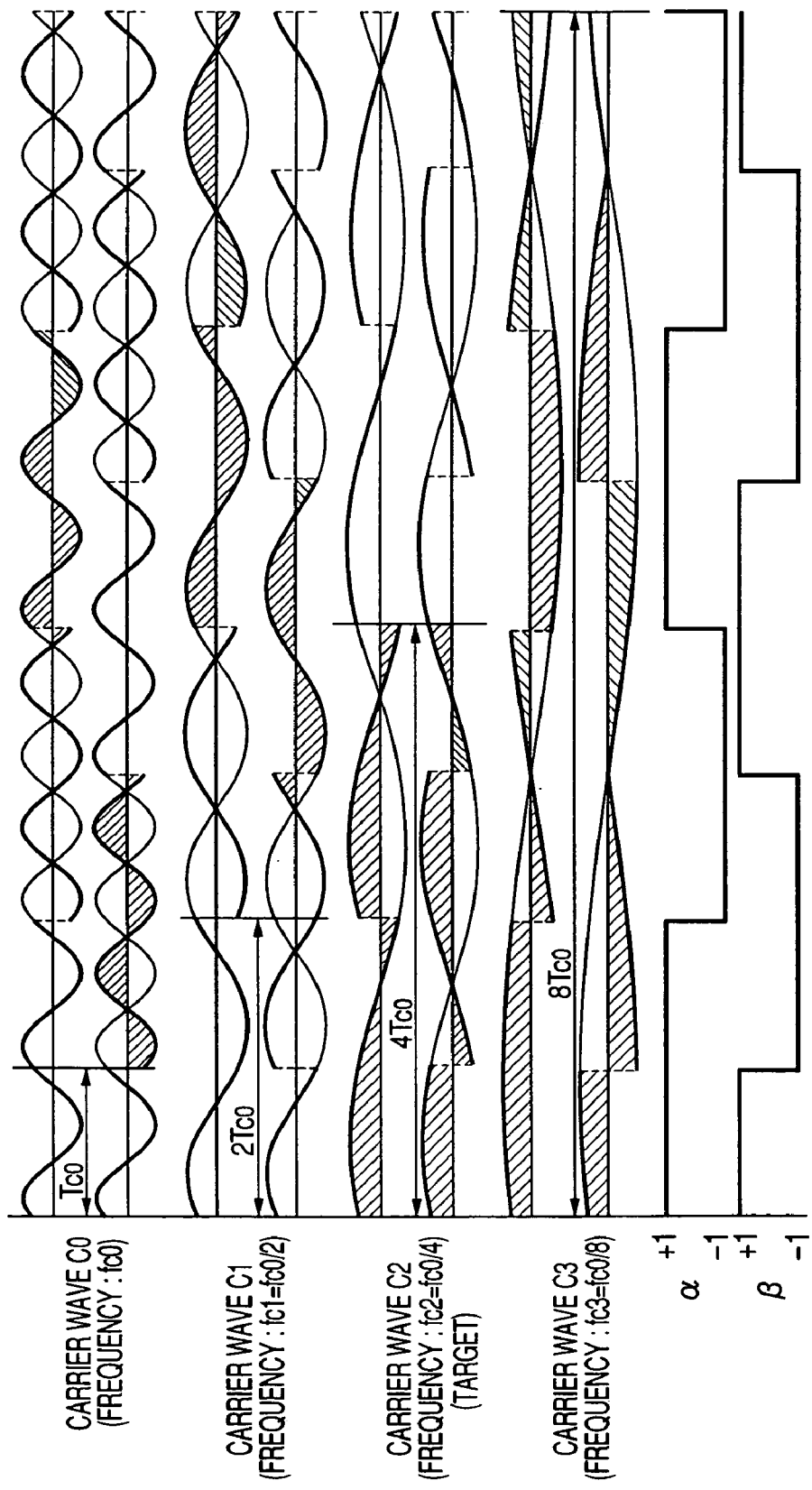
FIG. 16 is a waveform chart indicative of waveforms of the carrier waves including a target carrier wave whose frequency is fc2 when the phase thereof is 45 degrees according to the fifth embodiment of the invention.
Figure 17:
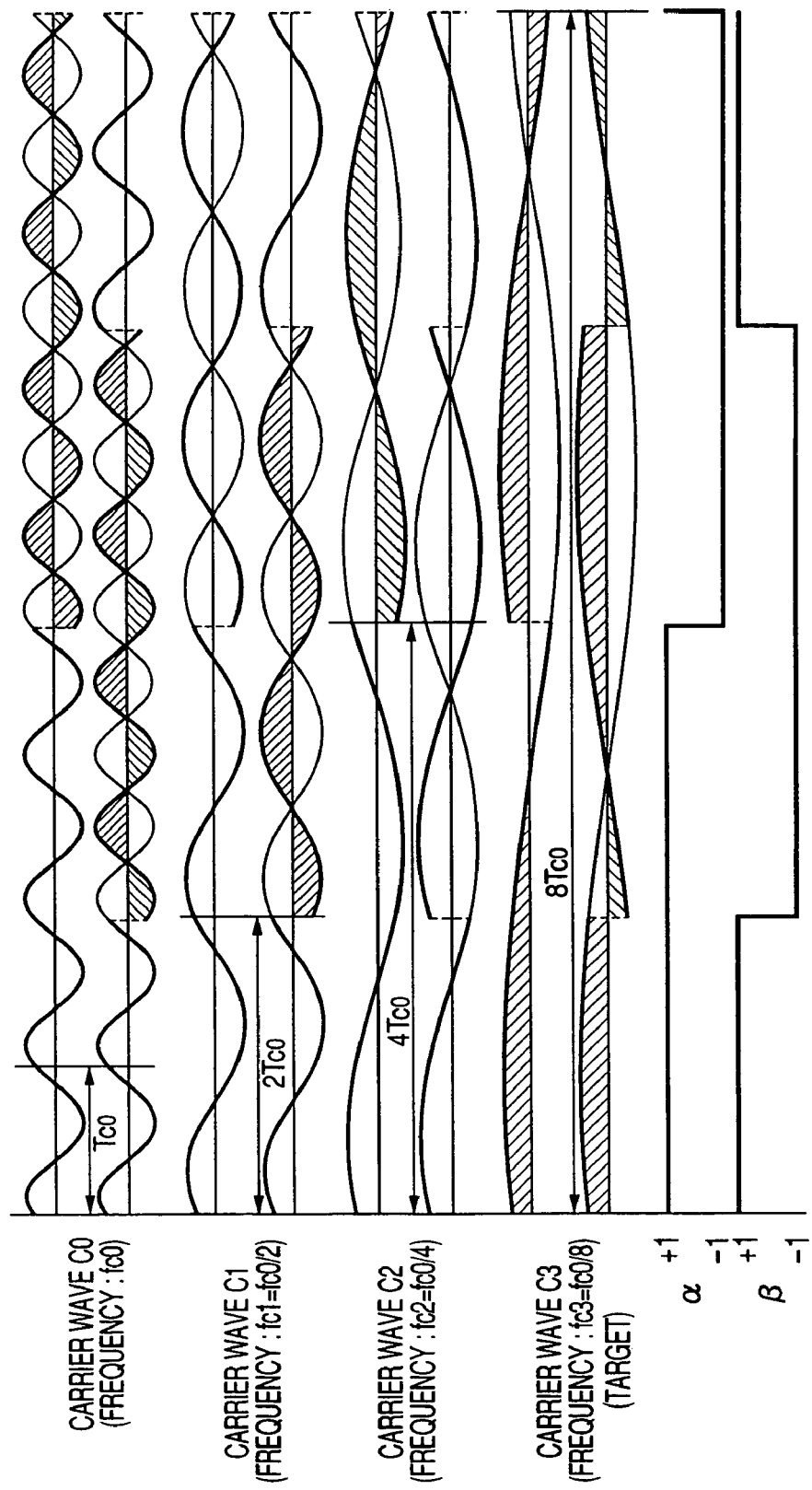
FIG. 17 is a waveform chart indicative of waveforms of the carrier waves including a target carrier wave whose frequency is fc3 when the phase thereof is 45 degrees according to the fifth embodiment of the invention.

Similarly, in FIGS. 15 to 17, integrating other carrier waves except for the target carrier wave C1 to C3 within their respective periods becomes nearly zero. This permits each of the target carrier waves C1, C2, and C3 whose frequencies fcn=fc1, fc2, and fc3 to be detected, making it possible to obtain each of the amplitudes An (n=1, 2, and 3) and the phases pn (n=1, 2, and 3) of the target carrier waves C1, C2, and C3.

As described above, the synchronous detection circuit 43 according to the fifth embodiment is applicable to multiplex communications using a plurality of carrier waves. That is, the synchronous detection circuit 43 according to the fifth embodiment allows detection at least one carrier wave modulated to carry a signal, thereby demodulating the at least one carrier wave to detect the signal.

In this fifth embodiment, in common with the third embodiment, the phase correcting circuit 38 of the synchronous detection circuit 43 makes compensation of the phase of the target carrier wave, which is obtained during plural times of the processing circuit 46 per each period Tc. The phase correcting circuit 38 outputs a result of the phase compensation of the target carrier wave's phase in synchronization with the clock signal CK20. As a modification of the synchronous detection circuit 43, the adder-subtractor 45 and the processing circuit 46 may operate for each period that is a quadruple of the period of the clock signal CK20, in other words, that is one period of the carrier wave C0 whose frequency is the highest in the carrier waves. The synchronous detection circuit 43 according to the modification allows the phase correcting circuit 38 to be omitted.

Sixth Embodiment

A sixth embodiment of the present invention will be described hereinafter. Incidentally, elements in the sixth embodiment, which are substantially identical with those in the second to fifth embodiments, are assigned to the same characters as the second to fifth embodiments so that detail explanations thereabout are omitted.

The synchronous detection device 1E according to the sixth embodiment is provided with a synchronous detection circuit 47 that operates in response to the clock signal CK20 which has a period Ts that is a quarter of the period Tc0 of the carrier wave C0 having the highest frequency. The synchronous detection circuit 47 has a phase adjusting circuit (PAC) 48 to which a synchronizing signal SZ is inputted. The synchronous detection circuit 47, as compared with the structure of the synchronous detection circuit 43, has no 2-bit counter 37, processing circuit 46, and phase correcting circuit 38, which are omitted therefrom.

The synchronous detection circuit 47 has an adder-subtractor 49.

The adder-subtractor 49 operates, in synchronization with the clock signal CK20, to capture the moving-average values S1, S2, . . . , S32 sequentially latched by the first to the 32-th registers 26a1, . . . , 26a32 and to perform adding and subtracting operations of the first to the 32-th moving average values S1 to S32. The adder-subtractor 49 is operative to directly output the values DI0, DQ0, DI1, DQ1, DI2, DQ2, DI3, and DQ3.

That is, in the fifth embodiment, when the phases of the plurality of carrier waves constituting the input signal are unknown, the synchronous detection circuit 43 is configured to obtain individually the amplitude and the phase of each of the carrier waves.

In contrast, in the sixth embodiment, it is assumed that the phases of the carrier waves are recognized. In this assumption, the carrier waves (sine waves) C0, C0', C1, C1', C2, C2', . . . , CN, CN' are prepared. The pairs of carrier waves (C0, C0'), (C1, C1'), (C2, C2'), . . . , (CN, CN') have the frequencies of fc0, fc1, fc2, ..., fcN, respectively. Each of the paired carrier waves (C0, C0'), (C1, C1'), (C2, C2'), ..., (CN, CN') has a phase difference of 90 degrees from each other.

The paired carrier waves (C0, C0'), (C1, C1'), (C2, C2'), ..., (CN, CN') are individually modulated in amplitude to carry a signal. The modulated waves are multiplexed so that an input signal (multiplex signal) is generated. In this sixth embodiment, the N is set to "3".

In this case, assuming that the phase pn is equal to zero, the input signal S(t) is represented as the following equation:

$$S(t) = A\sin 2\pi ft + B\cos 2\pi ft \quad \text{[Equation 23]}$$
$$= A\sin 2\pi ft + B\sin(2\pi ft + \pi/2)$$

where the f represents fc0, fc1, fc2, ..., fcN, the A represents A0, A1, A2, ..., AN, which are amplitudes of the carrier waves C0, C1, C2, ..., CN, respectively, and the B represents B0, B1, B2, ..., BN, which are amplitudes of the carrier waves C0', C1', C2', ..., CN', respectively.

That is, the input signal S(t) is composed of a first group of the amplitude-modulated carrier waves C0, C1, C2, ..., CN, which is represented as "A sin 2 π ft", and a second group of the amplitude-modulated carrier waves C0', C1', C2', ..., CN', which is represented as "B sin(2πft+π/2)". The A sin 2πft and the B sin(2πft+π/2) have the phase difference of 90 degrees from each other.

The adder-subtractor 45 calculates the $I_{n,m}$ and the $Q_{n,m}$ in accordance with the following equations:

$$I_{n,m} = \frac{2^{N-n+1}A_n}{\pi f_{cn}} \quad \text{[Equation 24]}$$

$$Q_{n,m} = \frac{2^{N-n+1}B_n}{\pi f_{cn}} \quad \text{[Equation 25]}$$

As clearly shown in the equations 24 and 25, the $I_{n,m}$ is proportional to the amplitude An and independent of the amplitude Bn, and the $Q_{n,m}$ is proportional to the amplitude Bn and independent of the amplitude An.

In the sixth embodiment, the N is set to "3" so that the first group of the amplitude-modulated carrier waves C0 to C3 and the second group of the amplitude-modulated carrier waves C0' to C3' are multiplied in the input signal S(t).

That is, in the synchronous detection circuit 47, the amplitudes A0 to A3 of the first group of the amplitude-modulated carrier waves C0 to C3 and the amplitudes B0 to B3 of the second group of the amplitude-modulated carrier waves C0' to C3' are obtained as the outputs DI0 to DI3 and DQ0 to DQ3, respectively. The obtained amplitudes A0 to A3 and the B0 to B3 are outputted from the adder-subtractor 49.

In this sixth embodiment, the phase of the clock signal CK20 is adjusted by the phase adjusting circuit 48 so that the phase of the clock signal CK20 and that of the carrier wave C0 coincide with each other.

As a result, it is possible to use the outputted values DI0 to DI3 and DQ0 to DQ3 as the amplitudes A0 to A3 and B0 to B3 of the carrier waves C0 to C3 and C0' to C3', respectively.

This structure allows the processing circuit 34 to be omitted therefrom, making it possible to reduce further the synchronous detection device 1E in size and in cost.

Figure 18:
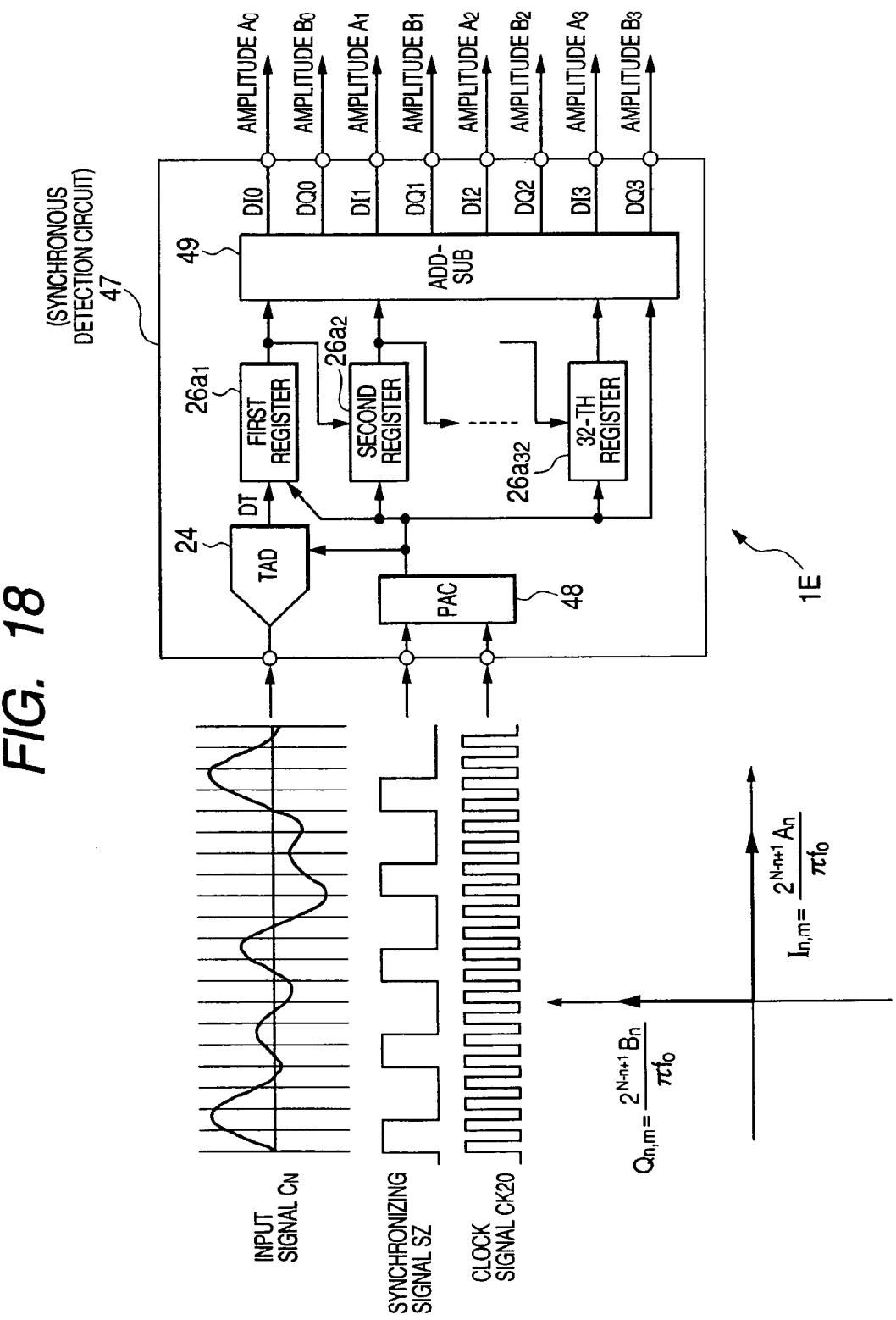
FIG. 18 is a block diagram for explaining a structure of a synchronous detection device and input signals with respect to the synchronous detection device according to a sixth embodiment of the invention.

The $I_{n,m}$ and the $Q_{n,m}$ are illustrated on a complex plane in FIG. 18 as detection outputs corresponding to the carrier wave Cn, respectively.

While there has been described what is at present considered to be the embodiments and modifications of the invention, it will be understood that various modifications which are not described yet may be made therein, and it is intended to cover in the appended claims all such modifications as fall within the true spirit and scope of the invention.

What is claimed is:

1. A synchronous detection method, performed in a synchronous detection device, of detecting a target carrier wave from an input signal containing the target carrier wave, the target carrier wave periodically oscillating positively and negatively in time according to a constant frequency and a period, the method comprising:

inputting, in a synchronous detection device, an input signal containing the target carrier wave;

averaging, in the synchronous detection device, the input signal over at least first and second phase ranges of the target carrier wave within each period thereof to obtain at least first and second moving average values of the input signal within the at least first and second phase ranges, respectively, the first phase range corresponding to a phase range within which the target carrier wave positively oscillates, the second phase range corresponding to a phase range within which the target earner wave negatively oscillates; and calculating, in the synchronous detection device, a difference between the first and second moving averages, to produce as an output signal, a detection result of the target carrier wave.

2. A synchronous detection method according to claim 1, wherein the averaging step averages the input signal each half of each period of the target carrier wave, the first phase range is between 0 degrees and 180 degrees, and the second phase range is between 180 degrees and 360 degrees.

3. A synchronous detection method according to claim 1, wherein the input signal contains only the target carrier wave or at least one of a first to a sixth carrier waves in addition to the target carrier wave, the first carrier wave having a frequency equal to the constant frequency of the target carrier wave and a phase difference of approximately 90 degrees at the first carrier wave's frequency with respect to the target carrier wave, the second carrier wave whose frequency is an even multiple of the constant frequency of the target carrier wave, the third carrier wave whose frequency is an even submultiple of the constant frequency of the target carrier wave, the fourth carrier wave having a frequency that is an odd multiple of the constant frequency of the target carrier wave and having a phase difference of approximately 90 degrees at the fourth carrier wave's frequency with respect to the target carrier wave, the fifth carrier wave having a frequency that is an odd submultiple of the constant frequency of the target carrier wave and having a phase difference of approximately 90 degrees at the fifth carrier wave's frequency with respect to the target carrier wave, the sixth carrier wave having a frequency that is obtained by multiplying the constant frequency of the target carrier wave by a rotational number except for odd numbers.

4. A synchronous detection method, performed in a synchronous detection device, of detecting a target carrier wave with a constant frequency and a period from an input signal containing the target carrier wave, the method comprising:

inputting, in a synchronous detection device, an input signal containing the target carrier wave;

averaging, in the synchronous detection device, the input signal each half of each period of the target carrier wave to obtain a first moving average value, a second moving average value, a third moving average value, and a fourth moving average value, the first moving average value of the input signal being within a phase range between an arbitrary phase (p) in degrees of the target carrier wave and (p+180) degrees thereof, the second moving average value of the input signal being within a phase range between (p+180) degrees of the target carrier wave and (p+360) degrees thereof, the third moving average value of the input signal being within a phase range between (p+90) degrees of the target carrier wave and (p+270) degrees thereof, the fourth moving average value of the input signal being within a phase range between (p+270) degrees and (p+450) degrees; and calculating, in the synchronous detection device, a first difference between the first moving average and the second moving average and a second difference between the third moving average and the fourth moving average, to produce as an output signal, a detection result of the target carrier wave.

5. A synchronous detection method according to claim 4, wherein the input signal contains only the target carrier wave or at least one of a first to a sixth carrier waves in addition to the target carrier wave, the first carrier wave having a frequency equal to the constant frequency of the target carrier wave and a phase difference of approximately 90 degrees at the first carrier wave's frequency with respect to the target carrier wave, the second carrier wave whose frequency is an even multiple of the constant frequency of the target carrier wave, the third carrier wave whose frequency is an even submultiple of the constant frequency of the target carrier wave, the fourth carrier wave having a frequency that is an odd multiple of the constant frequency of the target carrier wave and having a phase difference of approximately 90 degrees at the fourth carrier wave's frequency with respect to the target carrier wave, the fifth carrier wave having a frequency tat is an odd submultiple of the constant frequency of the target carrier wave and having a phase difference of approximately 90 degrees at the fifth carrier wave's frequency with respect to the target carrier wave, the sixth carrier wave having a frequency that is obtained by multiplying the constant frequency of the target carrier wave by a rotational number except for odd numbers.

6. A synchronous detection method, performed in a synchronous detection device, of detecting a target carrier wave with a constant frequency and a period from an input signal containing the target carrier wave, the method comprising:

inputting, in a synchronous detection device, an input signal containing the target carrier wave;

averaging, in the synchronous detection device, the input signal each quarter of each period of the target carrier wave to obtain a first moving average value (S1), a second moving average value (S2), a third moving average value (S3), and a fourth moving average value (S4), the first moving average value S1 of the input signal being within a phase range between an arbitrary phase (p) in degrees of the target carrier wave and (p+90) degrees thereof, the second moving average value 52 of the input signal being within a phase range between (p+90) degrees of the target carrier wave and (p+180) degrees thereof, the third moving average value S3 of the input signal being within a phase range between (p+180) degrees of the target carrier wave and (p+270) degrees thereof, the fourth moving average value S4 of the input signal being within a phase range between (p+270) degrees and (p+360) degrees; and calculating, in the synchronous detection device, to produce as an output signal, I and Q representing a detection result of the target carrier wave in accordance with the following equations:

$I = S1 + S2 - S3.S4$ $Q = S1 - S2 - S3 + S4.$

7. A synchronous detection method according to claim 6, further comprising calculating an amplitude (A) of the target carrier wave and the phase p thereof in accordance with the following equations:

$$A = \frac{\pi f_c}{2}\sqrt{I^2 + Q^2}$$

$p = \arg(I + jQ)$ where arg(I+jQ) represents the argument of the complex number I+jQ.

8. A synchronous detection method according to claim 6, wherein the input signal contains only the target carrier wave or at least one of a first to a sixth carrier waves in addition to the target carrier wave, the first carrier wave having a frequency equal to the constant frequency of the target carrier wave and a phase difference of approximately 90 degrees at the first carrier wave's frequency with respect to the target carrier wave, the second carrier wave whose frequency is an even multiple of the constant frequency of the target carrier wave, the third carrier wave whose frequency is an even submultiple of the constant frequency of the target carrier wave, the fourth carrier wave having a frequency that is an odd multiple of the constant frequency of the target carrier wave and having a phase difference of approximately 90 degrees at the fourth carrier wave's frequency with respect to the target carrier wave, the fifth carrier wave having a frequency that is an odd submultiple of the constant frequency of the target carrier wave and having a phase difference of approximately 90 degrees at the fifth carrier wave's frequency with respect to the target carrier wave, the sixth carrier wave having a frequency that is obtained by multiplying the constant frequency of the target carrier wave by a rotational number except for odd numbers.

9. A synchronous detection method, performed in a synchronous detection device, of detecting a target carrier wave with a constant frequency and a period (Tc) from an input signal containing the target carrier wave, the method comprising:

inputting, in a synchronous detection device, an input signal containing the target carrier wave;

averaging, in the synchronous detection device, the input signal each quarter of each period Tc of the target carrier wave to obtain a first moving average value (Sk), a second moving average value (Sk+1), a third moving average value (Sk+2), and a fourth moving average value (Sk+3), the first moving average value Sk of the input signal being within a range between (k−1)Tc/4 and kTc/4, the second moving average value Sk+1 of the input signal being within a range between (k)Tc/4 and (k+1)Tc/4, the third moving average value Sk+2 of the input signal being within a range between (k+1)Tc/4 and (k+2)Tc/4, the fourth moving average value Sk+3 of the input signal being within a range between (k+2)Tc/4 and (k+3)Tc/4, the k being 1, 2, . . . , n (positive integer);

calculating, in the synchronous detection device, $I_k$ and $Q_k$ in accordance with the following equations:

$I_k = Sk + Sk+1 - Sk+2 - Sk+3$ $Q_k = Sk - Sk+1 - Sk+2 + Sk+3$; and calculating, in the synchronous detection device, to produce as an output signal, an amplitude ($A_k$) of the target carrier wave and the phase $p_k$ thereof in accordance with the following equations:

$A_k = \pi/2 \sqrt{I_k^2 + Q_k^2}$, $p_k = \arg(I_k + jQ_k) + (k-1)\pi/2$, where $\arg(I_k + jQ_k)$ represents the argument of the complex number $I_k + jQ_k$.

10. A synchronous detection method according to claim 9, wherein the input signal contains only the target carrier wave or at least one of a first to a sixth carrier waves in addition to the target carrier wave, the first carrier wave having a frequency equal to the constant frequency fc of the target carrier wave and a phase difference of approximately 90 degrees at the first carrier wave's frequency with respect to the target carrier wave, the second carrier wave whose frequency is an even multiple of the constant frequency fc of the target carrier wave, the third carrier wave whose frequency is an even submultiple of the constant frequency fc of the target carrier wave, the fourth carrier wave having a frequency that is an odd multiple of the constant frequency fc of the target carrier wave and having a phase difference of approximately 90 degrees at the fourth carrier wave's frequency with respect to the target carrier wave, the fifth carrier wave having a frequency that is an odd submultiple of the constant frequency fc of the target carrier wave and having a phase difference of approximately 90 degrees at the fifth carrier wave's frequency with respect to the target carrier wave, the sixth carrier wave having a frequency that is obtained by multiplying the constant frequency fc of the target carrier wave by a rotational number except for odd numbers.

11. A synchronous detection method, performed in a synchronous detection device, wherein an input signal contains a plurality of carrier waves Cn (n=0, 1, 2, . . . , N) that are selected from (N+1) types of carrier waves C0, C1, C2, . . . , CN (N is a positive integer) and are modulated therein, the carrier waves C0, C1, C2, . . . , CN having frequencies of fc0, fc1 equal to fc0/2, fc2 equal to fc0/4, . . . , fcN equal to fc0/$2^N$, respectively, the method comprising:

inputting, in a synchronous detection device, an input signal containing the target carrier wave;

averaging, in the synchronous detection device, the input signal over each phase range between a sum of a phase p of the carrier wave C0 and (k·90) degrees and that of the phase p of the carrier wave C0 and (k+1)·90 degrees to obtain moving average values $S_{1+m}, S_{2+m}, \ldots, S_{2N+2+m}$ (m=0, 1, 2, . . . , N), the k being equal to 0, 1, 2, . . . , $2^{N+2}-1$;

calculating, in the synchronous detection device, $I_{n,m}$ and $Q_{n,m}$ in accordance with the following equations:

$$I_{n,m} = \sum_{i=1}^{2^{N-n}} \left\{ \sum_{k=2^n(4i-4)+1}^{2^n(4i-3)} S_{k+m} + \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}$$

$$Q_{n,m} = \sum_{i=1}^{2^{N-n}} \left\{ \sum_{k=2^n(4i-4)+1}^{2^n(4i-3)} S_{k+m} - \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}; \text{ and}$$

calculating, in the synchronous detection device, to produce as an output signal, an amplitude ($A_n$) of the carrier waves Cn and the phase $p_n$ thereof in accordance with the following equations:

$$A_n = \frac{\pi f_{cn}}{2^{N-n+1}} \sqrt{I_{n,m}^2 + Q_{n,m}^2}$$

$$p_n = \arg(I_{n,m} + jQ_{n,m}) + \frac{\pi}{2^{n+1}} m$$

12. A synchronous detection method, performed in a synchronous detection device, wherein an input signal contains a plurality of carrier waves Cn (n=0, 1, 2, . . . , N) that are selected from (N+1) types of carrier waves C0, C1, C2, . . . , CN (N is a positive integer) and are modulated therein, and a plurality of Cn' that are selected from (N+1) types of carrier waves C0', C0', C1', C2', . . . , CN' and are modulated therein, the carrier waves C0, C1, C2, . . . , CN having frequencies of fc0, fc1 equal to fc0/2, fc2 equal to fc0/4, . . . , fcN equal to fc0/$2^N$, respectively, each of the carrier waves C0, C1, C2, . . . , CN having a phase difference of 90 degrees from a corresponding one of the carrier waves C0', C1', C2', . . . , CN' at a same frequency, the method comprising:

inputting, to a synchronous detection device, an input signal containing the target carrier wave;

averaging, in the synchronous detection device, the input signal over each phase range between a sum of a phase p of the carrier wave C0 and (k·90) degrees and that of the phase p of the carrier wave C0 and (k+1)·90 degrees to obtain moving average values $S_{1+m}, S_{2+m}, \ldots, S_{2N+2+m}$ (m=0, 1, 2, . . . , N), the k being equal to 0, 1, 2, . . . , $2^{N+2}-1$;

calculating, in the synchronous detection device, $I_{n,m}$ and $Q_{n,m}$ in accordance with the following equations:

$$I_{n,m} = \sum_{i=1}^{2^{N-n}} \left\{ \sum_{k=2^n(4i-4)+1}^{2^n(4i-3)} S_{k+m} + \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}$$

-continued $$Q_{n,m} = \sum_{i=1}^{2^{N-n}} \left\{ \sum_{k=2^n(4i-4)+1}^{2^n(4i-3)} S_{k+m} - \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}; \text{ and}$$

outputting, in the synchronous detection device, the calculated $I_{n,m}$ and $Q_{n,m}$, to produce as an output signal, detection results representing amplitudes of the carrier waves Cn and Cn', respectively.

13. A synchronous detection method according to claim 1, further comprising integrating or averaging the detection result to absorb a detection error contained in the detection result.

14. A synchronous detection method according to claim 1, wherein the averaging step further including:
  inputting a pulse signal and the input signal to a pulse delay circuit, respectively, the pulse delay circuit having a plurality of delay units serially connected to one another in a cascade, a level of the input signal allowing a delay time of each of the pulse delay units to be controlled, the pulse signal passing through the delay units while being delayed; and
  counting a number of the delay units through which the pulse signal passes within each half of each period of the target carrier wave to obtain the at least first and second moving average values.

15. A synchronous detection device for detecting a target carrier wave from an input signal containing the target carrier wave, the target carrier wave periodically oscillating positively and negatively in lime according to a constant frequency and a period, the device comprising:
  a moving-average unit configured to average the input signal over at least first and second phase ranges of the target earner wave within each period thereof to obtain at least first and second moving average values of the input signal within the at least first and second phase ranges, respectively, the first phase range corresponding to a phase range within which the target earner wave positively oscillates, the second phase range corresponding to a phase range within which the target earner wave negatively oscillates; and
  a calculating unit configured to calculate a difference between the first and second moving averages as a detection result of the target carrier wave.

16. A synchronous detection device according to claim 15, wherein the moving-average unit is configured to average the input signal each half of each period of the target carrier wave, the first phase range is between 0 degrees and 180 degrees, and the second phase range is between 180 degrees and 360 degrees.

17. A synchronous detection device for detecting a target carrier wave with a constant frequency and a period from an input signal containing the target carrier wave, the device comprising:
  a moving-average unit configured to average the input signal each half of each period of the target carrier wave to obtain a first moving average value, a second moving average value, a third moving average value, and a fourth moving average value, the first moving average value of the input signal being within a phase range between an arbitrary phase (p) in degrees of the target carrier wave and (p+180) degrees thereon the second moving average value of the input signal being within a phase range between (p+180) degrees of the target carrier wave and (p+360) degrees thereof, the third moving average value of the input signal being within a phase range between (p+90) degrees of the target carrier wave and (p+270) degrees thereof, the fourth moving average value of the input signal being within a phase range between (p+270) degrees and (p+450) degrees; and
  a calculating unit configured to calculate a first difference between the first moving average and the second moving average and a second difference between the third moving average and the fourth moving average as a detection result of the target caner wave.

18. A synchronous detection device for detecting a target carrier wave with a constant frequency and a period from an input signal containing the target carrier wave, the device comprising:
  a moving-average unit configured to average the input signal each quarter of each period of the target carrier wave to obtain a first moving average value (S1), a second moving average value (S2), a third moving average value (S3), and a fourth moving average value (S4), the first moving average value S1 of the input signal being within a phase range between an arbitrary phase (p) in degrees of the target carrier wave and (p+90) degrees thereof, the second moving average value S2 of the input signal being within a phase range between (p+90) degrees of the target carrier wave and (p+180) degrees thereof, the third moving average value S3 of the input signal being within a phase range between (p+180) degrees of the target carrier wave and (p+270) degrees thereof, the fourth moving average value S4 of the input signal being within a phase range between (p+270) degrees and (p+360) degrees; and
  a calculating unit configured to calculate I and Q representing a detection result of the target carrier wave in accordance with the following equations:

$I = S1+S2-S3-S4$ $Q = S1-S2-S3+S4.$

19. A synchronous detection device according to claim 18, wherein the calculating unit calculates an amplitude (A) of the target carrier wave and the phase p thereof in accordance with the following equations:

$$A = \frac{\pi f_c}{2}\sqrt{I^2 + Q^2}$$

$p = \arg(I+jQ)$ where $\arg(I+jQ)$ represents the argument of the complex number $I+jQ$.

20. A synchronous detection device for detecting a target carrier wave with a constant frequency arid a period (Tc) from an input signal containing the target carrier wave, the device comprising:
  a moving-average unit configured to average the input signal each quarter of each period Tc of the target carrier wave to obtain a first moving average value (Sk), a second moving average value (Sk+1), a third moving average value (Sk+2), and a fourth moving average value (Sk+3), the first moving average value Sk of the input signal being within a range between (k−1)Tc/4 and kTc/4, the second moving average value Sk+1 of the input signal being within a range between (k)Tc/4 and (k+1)Tc/4, the third moving average value Sk+2 of the input signal being within a range between (k+1)Tc/4 and (k+2)Tc/4, the fourth moving average value Sk+3 of the input signal being within a range between (k+2)Tc/4 and (k+3)Tc/4, the k being 1, 2, . . . , n (positive integer);

a calculating unit configured to calculate $I_k$ and $Q_k$ in accordance with the following equations:

$$I_k = Sk + Sk+1 - Sk+2 - Sk+3$$

$$Q_k = Sk - Sk+1 - Sk+2 + Sk+3$$

and configured to calculate an amplitude ($A_k$) of the target carrier wave and the phase $p_k$ thereof in accordance with the following equations:

$$A_k = \pi/2 \sqrt{I_k^2 + Q_k^2},$$

$$p_k = \arg(I_k + jQ_k) + (k-1)\pi/2$$

where $\arg(I_k+jQ_k)$ represents the argument of the complex number $I_k+jQ_k$.

21. A synchronous detection device, wherein an input signal contains a plurality of carrier waves Cn (n=0, 1, 2, . . . , N) that are selected from (N+1) types of carrier waves C0, C1, (C2, . . . , CN (N is a positive integer) and are modulated therein, the carrier waves (C0, C1, C2, . . . , CN having frequencies of fc0, fc1 equal to fc0/2, fc2 equal to fc0/4, . . . , fcN equal to $fc0/2^N$, respectively, the device comprising:

a moving-average unit configured to average the input signal over each phase range between a sum of a phase p of the carrier wave C0 and (k·90) degrees and that of the phase p of the carrier wave C0 and (k+1)·90 degrees to obtain moving average values $S_{1+m}, S_{2+m}, \ldots, S_{2N+2+m}$ (m=0, 1, 2, ), the k being equal to 0, 1, 2, . . . , $2^{N+2}-1$; and a calculating unit configured to calculate $I_{n,m}$ and $Q_{n,m}$ in accordance with the following equations:

$$I_{n,m} = \sum_{i=1}^{2^{N-n}} \left\{ \sum_{k=2^n(4i-4)+1}^{2^n(4i-3)} S_{k+m} + \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}$$

$$Q_{n,m} = \sum_{i=1}^{2^{N-n}} \left\{ \sum_{k=2^n(4i-4)+1}^{2^n(4i-3)} S_{k+m} - \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}$$

configured to calculate an amplitude ($A_n$) of the carrier waves Cn and the phase $p_n$ thereof in accordance with the following equations:

$$A_n = \frac{\pi f_{cn}}{2^{N-n+1}} \sqrt{I_{n,m}^2 + Q_{n,m}^2}$$

$$p_n = \arg(I_{n,m} + jQ_{n,m}) + \frac{\pi}{2^{n+1}} m.$$

22. A synchronous detection device, wherein an input signal contains a plurality of carrier waves Cn (n=0, 1, 2, . . . , N) that are selected from (N+1) types of carrier waves C0, C1, C2, . . . , CN (N is a positive integer) and are modulated therein, and a plurality of Cn' that are selected from (N+1) types of carrier waves C0', C1', C2', . . . , CN' and are modulated therein, the carrier waves C0, C1, C2, . . . , CN having frequencies of fc0, fc1 equal to fc0/2, fc2 equal to fc0/4, . . . , fcN equal to $fc0/2^N$, respectively, each of The carrier waves C0, C1, C2, . . . , CN having a phase difference of 90 degrees from a corresponding one of the carrier waves C0, C1, C2, . . . , CN at a same frequency, the device comprising:

a moving-average unit configured to input signal over each phase range between a sum of a phase p of the carrier wave C0 and (k·90) degrees and that of the phase p of the carrier wave C0 and (k+1)·90 degrees to obtain moving average values $S_{1+m}, S_{2+m}, \ldots, S_{2N+2+m}$ (m=0, 1, 2, . . . ), the k being equal to 0, 1, 2, . . . , $2^{N+2}-1$;

a calculating unit configured to calculate $I_{n,m}$ and $Q_{n,m}$ in accordance with the following equations:

$$I_{n,m} = \sum_{i=1}^{2^{N-n}} \left\{ \sum_{k=2^n(4i-4)+1}^{2^n(4i-3)} S_{k+m} + \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}$$

$$Q_{n,m} = \sum_{i=1}^{2^{N-n}} \left\{ \sum_{k=2^n(4i-4)+1}^{2^n(4i-3)} S_{k+m} - \sum_{k=2^n(4i-3)+1}^{2^n(4i-2)} S_{k+m} - \sum_{k=2^n(4i-2)+1}^{2^n(4i-1)} S_{k+m} + \sum_{k=2^n(4i-1)+1}^{2^n 4i} S_{k+m} \right\}$$ and configured to output the calculated $I_{n,m}$ and $Q_{n,m}$ as detection results representing amplitudes of the carrier waves Cn and Cn', respectively.

23. A synchronous detection device according to claim 15, further comprising a filter configured to integrate or average the detection result to absorb a detection error contained in the detection result.

24. A synchronous detection device according to claim 15, wherein the moving-average unit further comprises:

a pulse delay circuit having a plurality of delay units serially connected to one another in a cascade, each of the delay units is configured to, when a pulse signal and the input signal are inputted thereto, delay the inputted pulse signal by a delay time, a level of the input signal allowing the delay time of each of the pulse delay units to be controlled; and a count unit configured to count a number of the delay units through which the pulse signal passes within each half of each period of the target carrier wave to obtain the at least first and second moving average values.

\* \* \* \* \*